United States Patent
Snowdon et al.

(10) Patent No.: US 11,277,269 B2
(45) Date of Patent: Mar. 15, 2022

(54) SYSTEM AND METHODS FOR GENERATING AND AUTHENTICATING VERIFIABLE NETWORK TRAFFIC

(71) Applicant: Arista Networks, Inc., Santa Clara, CA (US)

(72) Inventors: David Snowdon, Darlinghurst (AU); Russel Lowes, Sydney (AU); Peter Testrake, Sydney (AU); Daniel Farrell, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 195 days.

(21) Appl. No.: 16/754,688

(22) PCT Filed: Dec. 13, 2018

(86) PCT No.: PCT/AU2018/000260
§ 371 (c)(1),
(2) Date: Apr. 8, 2020

(87) PCT Pub. No.: WO2019/113629
PCT Pub. Date: Jun. 20, 2019

(65) Prior Publication Data
US 2020/0235938 A1    Jul. 23, 2020

(30) Foreign Application Priority Data

Dec. 13, 2017 (AU) ............................... 2017905002
May 29, 2018 (AU) ............................... 2018901892

(51) Int. Cl.
*H04L 29/06* (2006.01)
*G06F 21/00* (2013.01)
(Continued)

(52) U.S. Cl.
CPC .......... *H04L 9/3242* (2013.01); *H04L 9/0643* (2013.01); *H04L 9/0872* (2013.01); *H04L 9/3263* (2013.01); *H04L 9/3297* (2013.01)

(58) Field of Classification Search
CPC ... H04L 9/3242; H04L 9/0643; H04L 9/0872; H04L 9/3263; H04L 9/3297
See application file for complete search history.

(56) References Cited

U.S. PATENT DOCUMENTS 9,264,333 B1    2/2016  Mizrani
2009/0034557 A1*  2/2009  Fluhrer ............... H04L 63/0272
                                                        370/474

(Continued)

OTHER PUBLICATIONS

Adams, C. et el., "Internet X.509 Public Key Infrastructure Certificate Management Protocol (CMP)", Network Working Group, Sep. 2005 (95 pages).

(Continued)

*Primary Examiner* — Lisa C Lewis
(74) *Attorney, Agent, or Firm* — Chamberlain, Hrdlicka, White, Williams & Aughtry

(57) ABSTRACT

System and methods for generating and authenticating verifiable network traffic. Specifically, the system and methods disclosed herein describe solutions for augmenting layer-2 (L2) frames with additional verifiable information entailing, for example, hash-based message authentication code encryption or digital signature authentication. These solutions may address scenarios where evidence of tampering, through deceptive practices, of network traffic data may prove difficult to detect.

20 Claims, 14 Drawing Sheets

(51) Int. Cl.
   *H04L 9/32*   (2006.01)
   *H04L 9/06*   (2006.01)
   *H04L 9/08*   (2006.01)

(56) References Cited

U.S. PATENT DOCUMENTS

| | | | | |
|---|---|---|---|---|
| 2009/0305673 | A1* | 12/2009 | Mardikar | H04W 12/04 455/411 |
| 2014/0037092 | A1* | 2/2014 | Bhattacharya | H04L 9/0891 380/259 |
| 2014/0379134 | A1* | 12/2014 | Tsuchiya | G06F 9/45558 700/275 |
| 2015/0032914 | A1* | 1/2015 | Brewerton | G06F 13/28 710/25 |
| 2015/0348015 | A1* | 12/2015 | Ren | G06Q 20/085 705/41 |
| 2017/0041826 | A1 | 2/2017 | Hersent | |
| 2019/0044721 | A1* | 2/2019 | Schultz | H04L 63/107 |

OTHER PUBLICATIONS

Stenn, H. "Network Time Protocol MAC/Last Extension Fields draft-stenn-ntp-mac-last-ef-01", Internet Engineering Task Force, Nov. 29, 2017 (7 pages).

Richer, J. et al., "OAuth 2.0 Message Authentication Code (MAC) Tokens draft-ietf-oauth-v2-http-mac-05.txt", OAuth, Jan. 15, 2014 (37 pages).

International Search Report and Written Opinion issued in corresponding Application No. PCT/AU2018/000260, dated Apr. 1, 2019 (10 pages).

* cited by examiner

SYSTEM AND METHODS FOR GENERATING AND AUTHENTICATING VERIFIABLE NETWORK TRAFFIC

BACKGROUND

Scenarios often exist in which evidence of tampering, through deceptive practices, of network traffic data may prove difficult to detect.

SUMMARY

In general, in one aspect, the invention relates to a method for generating verifiable network traffic. The method includes receiving a first layer-2 (L2) frame of a L2 frame stream, generating a first L2 frame timestamp for the first L2 frame, generating a first frame message using the first L2 frame and the first L2 frame timestamp, generating a first frame hash-based message authentication code (HMAC) using a hashing function, the first frame message, and a symmetric private key, appending a first timestamp trailer to the first L2 frame, to obtain a first augmented L2 frame, and transmitting the first augmented L2 frame to a frame auditor, wherein the first timestamp trailer comprises the first frame HMAC, the first L2 frame, and the first L2 frame timestamp.

In general, in one aspect, the invention relates to a method for authenticating verifiable network traffic. The method includes receiving a first augmented layer-2 (L2) frame of an augmented L2 frame stream, deconstructing the first augmented L2 frame, to obtain a first L2 frame and a first timestamp trailer, extracting a first frame hash-based message authentication code (HMAC) and a first L2 frame timestamp from the first timestamp trailer, generating a first frame message using the first L2 frame and the first L2 frame timestamp, generating a second frame HMAC using a hashing function, the first frame message, and a symmetric private key, and authenticating the first L2 frame through comparison of the first frame HMAC and the second frame HMAC.

In general, in one aspect, the invention relates to a system. The system includes a frame signer. The frame signer includes a first computer processor configured to receive a layer-2 (L2) frame of a L2 frame stream, generate a L2 frame timestamp for the L2 frame, generate a frame message using the L2 frame and the L2 frame timestamp, generate a frame hash-based message authentication code (HMAC) using a hashing function, the frame message, and a symmetric private key, append a timestamp trailer to the L2 frame, to obtain an augmented L2 frame, and transmit the augmented L2 frame, wherein the timestamp trailer comprises the frame HMAC, the L2 frame, and the L2 frame timestamp.

Other aspects of the invention will be apparent from the following description and the appended claims.

DETAILED DESCRIPTION

Figure 1:
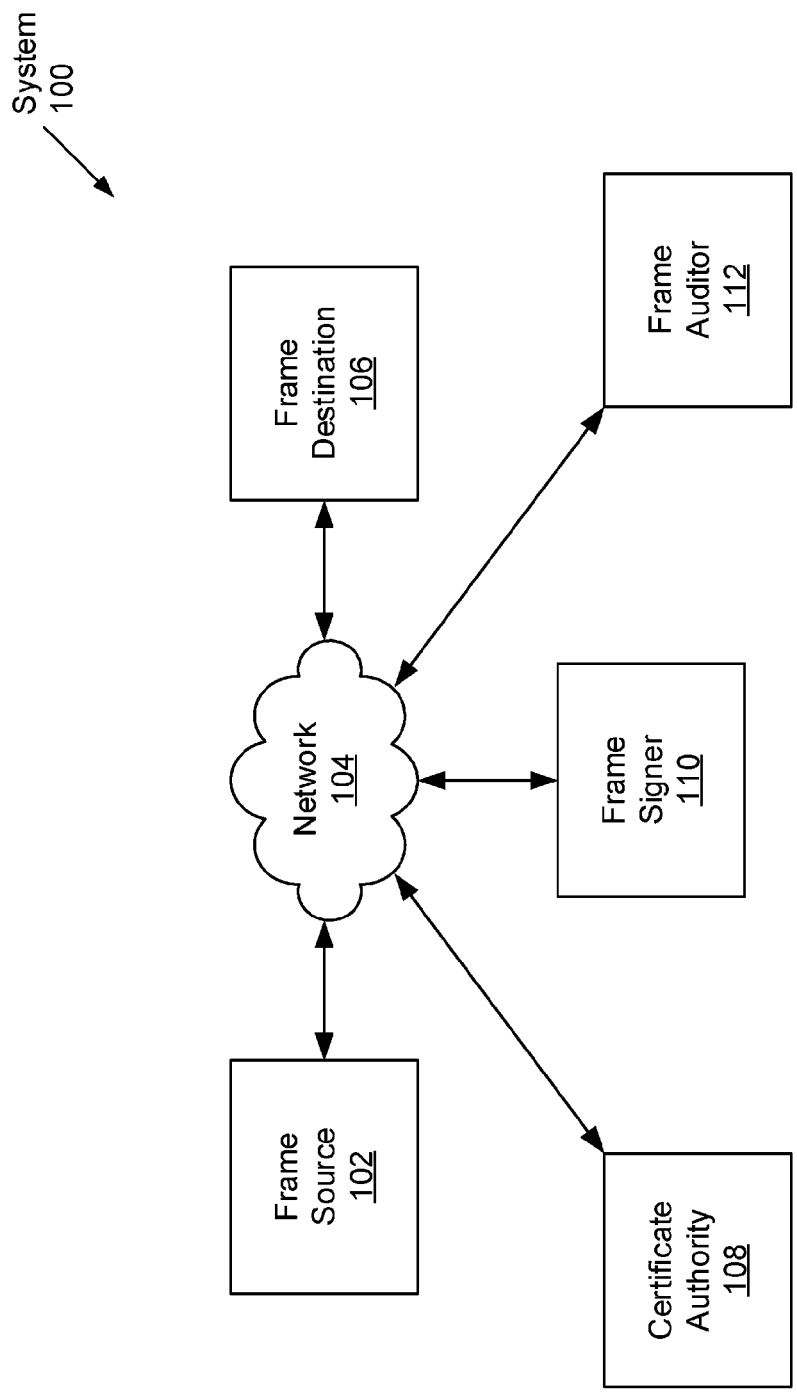
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a system and methods for generating and authenticating verifiable network traffic. Specifically, one or more embodiments of the invention describe solutions for augmenting layer-2 (L2) frames with additional verifiable information entailing, for example, hash-based message authentication code encryption or digital signature authentication. These solutions may address scenarios where evidence of tampering, through deceptive practices, of network traffic data may prove difficult to detect.

For example, in electronic trading markets, market authorities may require traders and other market participants to retain accurate records of electronic trading activity. These financial instrument (e.g., stocks, bonds, etc.) records, amongst other information, may encode electronic transaction timestamps, which may serve to reconstruct respective electronic trading transactions. Occasionally, however, any given market participant may wish to falsify financial instrument records. The purpose of the falsification may be to hide illegal transactions, conceal illegitimate trading decisions, increase the likelihood of obtaining further warrants through deception, avoid legal or regulatory consequences, or misrepresent the performance of the given market participant. Further, these deceptive practices may counter market regulation, and undermine market stability, confidence, and consumer protection. Existing solutions struggle to identify such falsified records.

FIG. 1 shows a system in accordance with one or more embodiments of the invention. The system (100) may include a frame source (102), a frame destination (106), a certificate authority (108), a frame signer (110), and a frame auditor (112). Each of these components is described below.

In one embodiment of the invention, the above-mentioned components may be directly or indirectly connected to one another through a network (104) (e.g., a local area network (LAN), a wide area network (WAN) such as the Internet, a mobile network, or any other network). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing. Further, the above-mentioned components may communicate with one another using any combination of wired and/or wireless communication protocols.

In one embodiment of the invention, the frame source (102) may represent any physical computing system that at least generates and transmits layer-2 (L2) frame streams directed to the frame destination (106). Each L2 frame stream may represent any single transmission of data from the frame source (102) to the frame destination (106), which may encompass one or more L2 frames (see e.g., FIG. 2A). Further, each L2 frame stream may enclose content (or data) (e.g., electronic trading activity information) that the frame source (102) (e.g., an electronic trading system) may be attempting to transmit to the frame destination (106) (e.g., an electronic trading exchange). Examples of the frame source (102) may include, but are not limited to, a desktop computer, a laptop computer, a smartphone, a tablet computer, a server, a mainframe, or any computing system similar to the exemplary computing system shown in FIG. 8.

In one embodiment of the invention, the frame destination (106) may represent any physical computing system that at least receives L2 frame streams originating from the frame source (102). Each L2 frame stream may represent any single transmission of data from the frame source (102) to the frame destination (106), which may encompass one or more L2 frames (see e.g., FIG. 2A). Further, each L2 frame stream may enclose content (or data) (e.g., electronic trading activity information) that the frame source (102) (e.g., an electronic trading system) may be attempting to transmit to the frame destination (106) (e.g., an electronic trading exchange). Examples of the frame destination (106) may include, but are not limited to, a desktop computer, a laptop computer, a smartphone, a tablet computer, a server, a mainframe, or any computing system similar to the exemplary computing system shown in FIG. 8.

In one embodiment of the invention, the certificate authority (108) may represent any physical computing system that at least issues and/or publishes digital certificates. A digital certificate may represent an electronic document that presents credentials for verifying the identity of a certificate owner—e.g., an owner of the digital certificate. More specifically, a digital certificate may represent an electronic document that proves ownership of a public key, which may be enclosed in the digital certificate. A public key may represent a publicly published and/or accessible encryption key, which may be used in asymmetric cryptography to encrypt plaint-text data (i.e., unencrypted data), thereby generating cipher-text data (i.e., encrypted data). Furthermore, the digital certificate may also generally include various information describing the enclosed public key and the certificate owner; as well as a digital signature associated with the certificate issuer—e.g., the certificate authority (108)—whom may include functionality to verify the contents of the digital certificate. Examples of the certificate authority (108) may include, but are not limited to, a desktop computer, a laptop computer, a smartphone, a tablet computer, a server, a mainframe, or any computing system similar to the exemplary computing system shown in FIG. 8.

In one embodiment of the invention, the frame signer (110) may represent any physical computing system that at least generates and transmits augmented L2 frame streams (also referred herein as verifiable network traffic) directed to the frame auditor (112). Each augmented L2 frame stream may represent any single transmission of data from the frame signer (110) to the frame auditor (112), which may encompass one or more augmented L2 frames (see e.g., FIG. 2B). Further, each augmented L2 frame stream may enclose content (or data) (e.g., verifiable electronic trading activity information) that the frame signer (110) (e.g., an electronic trading information signing solution) may be attempting to transmit to the frame auditor (112) (e.g., an electronic trading regulatory or compliance system). With respect to embodiments of the invention, the frame signer (110) may at least include functionality to generate symmetric private keys, new key messages, and new key hash-based message authentication codes (HMACs) (described below) (see e.g., FIG. 3); and generate verifiable network traffic (described below) (see e.g., FIGS. 4A, 4B, and 6A-6C). Examples of the frame signer (110) may include, but are not limited to, a desktop computer, a laptop computer, a smartphone, a tablet computer, a server, a mainframe, a network switch, a network router, a network multilayer switch, or any computing system similar to the exemplary computing system shown in FIG. 8.

In one embodiment of the invention, the frame auditor (112) may represent any physical computing system that at least receives and verifies augmented L2 frame streams originating from the frame signer (110). Each augmented L2 frame stream may represent any single transmission of data from the frame signer (110) to the frame auditor (112), which may encompass one or more augmented L2 frames (see e.g., FIG. 2B). Further, each augmented L2 frame stream may enclose content (or data) (e.g., verifiable electronic trading activity information) that the frame signer (110) (e.g., an electronic trading information signing solution) may be attempting to transmit to the frame auditor (112) (e.g., an electronic trading regulatory or compliance system). With respect to embodiments of the invention, the frame auditor (112) may at least include functionality to authenticate verifiable network traffic (i.e., authenticate augmented L2 frame streams) (described below) (see e.g., FIGS. 5A, 5B, 7A, and 7B). Examples of the frame auditor (112) may include, but are not limited to, a desktop computer, a laptop computer, a smartphone, a tablet computer, a server, a mainframe, or any computing system similar to the exemplary computing system shown in FIG. 8.

While FIG. 1 shows a configuration of components, other system configurations may be used without departing from the scope of the invention. For example, the system (100) may additionally include a network splitter (not shown), which may reside within the network (104). With respect to embodiments of the invention, the network splitter may represent a physical device—e.g., a network device (described above) or any computing system similar to the exemplary computing system shown in FIG. 8—that may include functionality to replicate network traffic without interrupting normal network traffic flow. Further, while the original network traffic (e.g., a L2 frame stream), from the frame source (102), proceeds to the frame destination (106), the replicated network traffic (e.g., a copy of the L2 frame stream) may be directed to the frame signer (110).

Figure 2A:
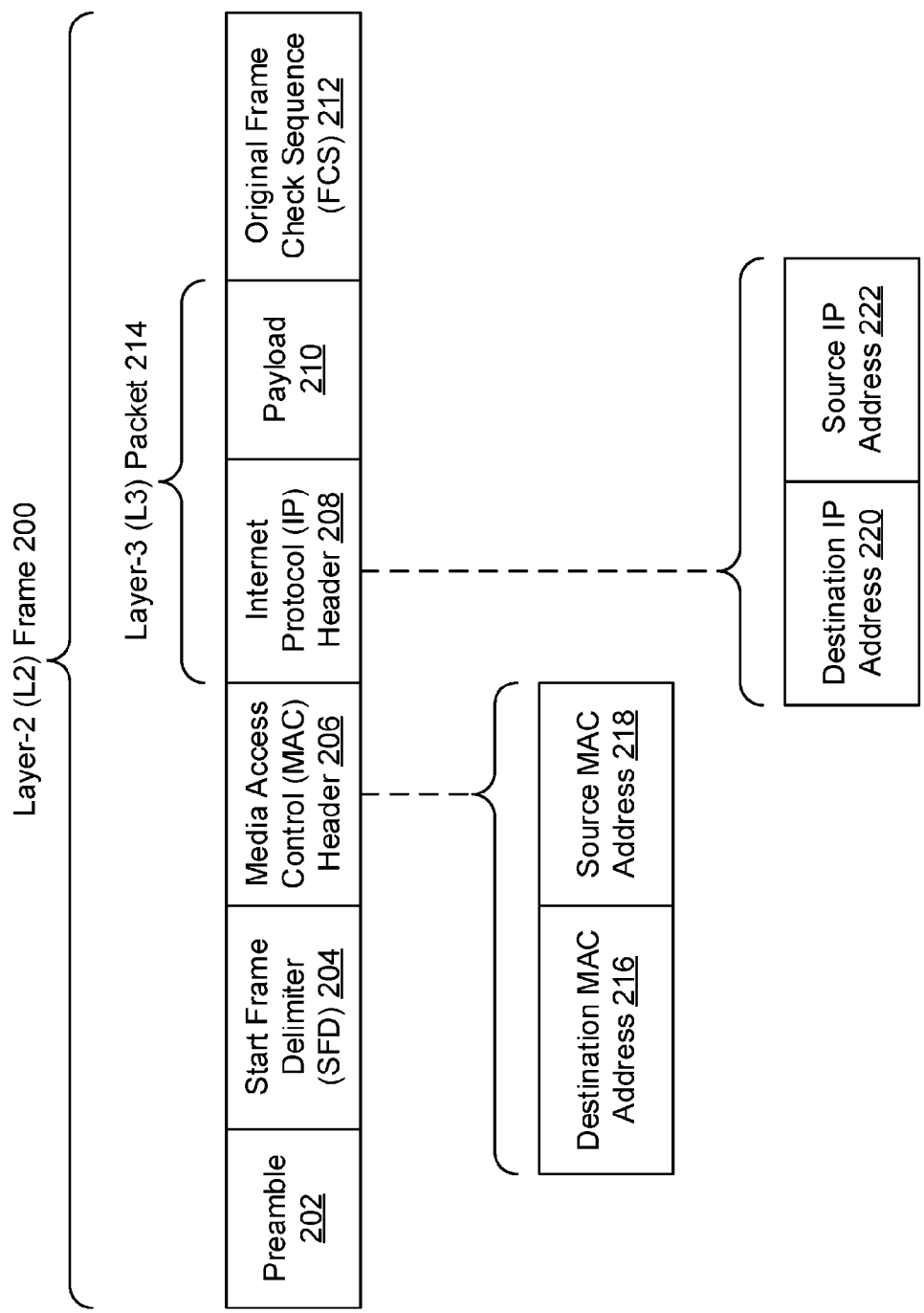
FIG. 2A shows a layer-2 frame in accordance with one or more embodiments of the invention.

FIG. 2A shows a layer-2 (L2) frame in accordance with one or more embodiments of the invention. The L2 frame (200) may refer to a data link layer protocol data unit (PDU) (also referred to as an Ethernet or media access control (MAC) frame). Further, the L2 frame (200) may be generated by a source host (e.g., the frame source (described above)) and may include, but is not limited to, a preamble (202), a start frame delimiter (SFD) (204), a MAC header (206), an Internet Protocol (IP) header (208), a payload (210), and an original frame check sequence (FCS) (212). Each of these components is described below.

In one embodiment of the invention, the preamble (202) may represent a frame field including a collection of bits (i.e., binary digits), which may allow the source host and a destination host (e.g., the frame destination) to synchronize their communications. The SFD (204), meanwhile, may represent a frame field including a predefined collection of bits (i.e., binary digits) (e.g., '10101011'), which may serve to indicate the start of the L2 frame (200).

In one embodiment of the invention, the MAC header (206) may collectively represent various information required for data link layer forwarding of the L2 frame (200) through a network. Specifically, the MAC header (206) may include, but is not limited to including, a destination MAC address (216) and a source MAC address (218). The destination MAC address (216) may represent a unique data link layer identifier assigned to or associated with the destination host, whereas the source MAC address (218) may represent a unique data link layer identifier assigned to or associated with the source host.

In one embodiment of the invention, the IP header (208) may collectively represent various information required for network layer routing of the L2 frame (200) through a network. Specifically, the IP header (208) may include, but is not limited to including, a destination IP address (220) and a source IP address (222). The destination IP address (220) may represent a unique network layer identifier assigned to or associated with the destination host, whereas the source IP address (222) may represent a unique network layer identifier assigned to or associated with the source host.

In one embodiment of the invention, the payload (210) may refer to the content (or data) that the source host may be attempting to transmit to the destination host. At least the IP header (208) and the payload (210) collectively together may define a layer-3 (L3) packet (214). The L3 packet (214) may refer to a network layer protocol data unit (PDU) (also referred to as an IP packet). Further, the original FCS (212) may represent a frame field including a cyclic redundancy check (CRC) code, which may enable the detection of errors or corrupt data within the L2 frame (200).

One of ordinary skill will appreciate that the L2 frame (200) may include other information or content without departing from the scope of the invention.

Figure 2B:
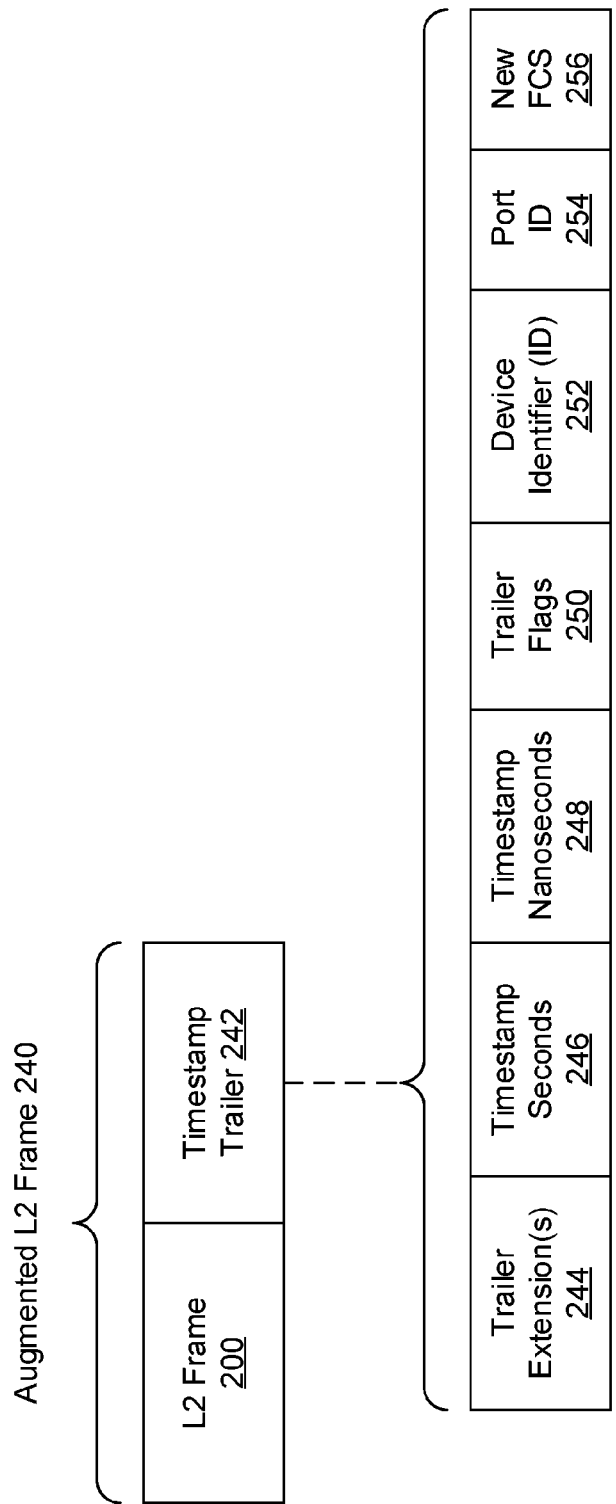
FIG. 2B shows an augmented layer-2 frame in accordance with one or more embodiments of the invention.

FIG. 2B shows an augmented layer-2 (L2) frame in accordance with one or more embodiments of the invention. The augmented L2 frame (240) may represent an extended data link layer protocol data unit (PDU) (also referred to as an Ethernet or media access control (MAC) frame) and may be generated by the frame signer (see e.g., FIG. 1). Further, the augmented L2 frame (240) may include a L2 frame (described above with respect to FIG. 2A) and a timestamp trailer (242). The timestamp trailer (242) may collectively represent various information detailing the verifiable network traffic generation process—e.g., the methods disclosed in FIGS. 4A and 4B, or FIGS. 6A-6C. Specifically, the timestamp trailer (242) may include zero or more trailer extensions (244), a timestamp seconds (246), a timestamp nanoseconds (248), one or more trailer flags (250), a device identifier (ID) (252), a port identifier (ID) (254), and a new frame check sequence (FCS) (256). Each of these components is described below.

In one embodiment of the invention, the trailer extension (s) (244) (if present), collectively, may represent a payload field of the L2 frame (200). Specifically, the trailer extension (s) (244) may be a frame field populated with content (or data) that the augmented L2 frame (240) transmitter (e.g., the frame signer) may be attempting to transmit to the augmented L2 frame (240) receiver (e.g., the frame auditor). Examples of content/data that may populate the trailer extension(s) (244) may include any subset of the following: an L2 frame timestamp, a frame hash-based message authentication code (HMAC), the L2 frame (200), a new key message, a new key HMAC, and a signature message. Each of these exemplary content/data is described in further detail below with respect to FIGS. 3-7B.

In one embodiment of the invention, the timestamp seconds (246) may represent a big endian unsigned integer that indicates the number of seconds that have elapsed since a specified date—e.g., Jan. 1, 1970. Meanwhile, the timestamp nanoseconds (248) may represent a big endian unsigned integer that indicates the number of nanoseconds since the start of the latest second (indicated by the timestamp seconds (246)). Collectively, the timestamp seconds (246) and the timestamp nanoseconds (248) may be referred herein as time information or a L2 frame timestamp. The aforementioned time information or L2 frame timestamp may represent encoded information (e.g., a sequence of characters—e.g., letters, numbers, symbols, etc.) identifying a precise date and/or time when a respective L2 frame (200) may have been received by the augmented L2 frame (240) transmitter. Further, the aforementioned precise data and/or time may be accurate up to the nanosecond (or picosecond) resolution, which may be achieved through the employment of the precision time protocol (PTP) and/or a global positioning system time (GPST) receiver.

In one embodiment of the invention, the trailer flag(s) (250) may encompass a collection of bits (i.e., binary digits), where each subset of one or more bits may reflect a state descriptive of another field in the L2 frame (200) and/or the timestamp trailer (242). By way of an example, one bit of the trailer flag(s) (250), positioned at a predetermined bit location, may be used to indicate whether the timestamp trailer (242) includes at least one trailer extension (244)—e.g., a binary digit of '1' may indicate that the timestamp trailer (242) does include at least one trailer extension (244), whereas a binary digit of '0' may alternatively indicate that the timestamp trailer (242) does not include any trailer extensions (244). By way of another example, another bit of the trailer flag(s) (250), positioned at another predetermined bit location, may be used to indicate whether the original FCS (see e.g., FIG. 2A) is valid—e.g., a binary digit of '1' may indicate that the original FCS is valid, whereas a binary digit of '0' may alternatively indicate that the original FCS is invalid.

In one embodiment of the invention, the device Ill (252) may represent an unsigned integer that indicates a unique identifier assigned to or associated with the entity/device—e.g., the frame signer—whom appended the timestamp trailer (242) to the L2 frame (200), to generate the augmented L2 frame (240). The device ID (252) may also be referred herein as device identification information. On the other hand, the port ID (254) may represent an unsigned integer that indicates a unique identifier assigned to or associated with the physical network interface, of the entity/device identified by the device ID (252), through which the L2 frame (200) had been received. The port ID (254) may also be referred herein as port identification information. Moreover, the new FCS (256) may represent a frame field including a cyclic redundancy check (CRC) code, which may enable the detection of errors or corrupt data within the augmented L2 frame (240).

The timestamp trailer (242) may include additional or alternative information without departing from the scope of the invention.

Figure 3:
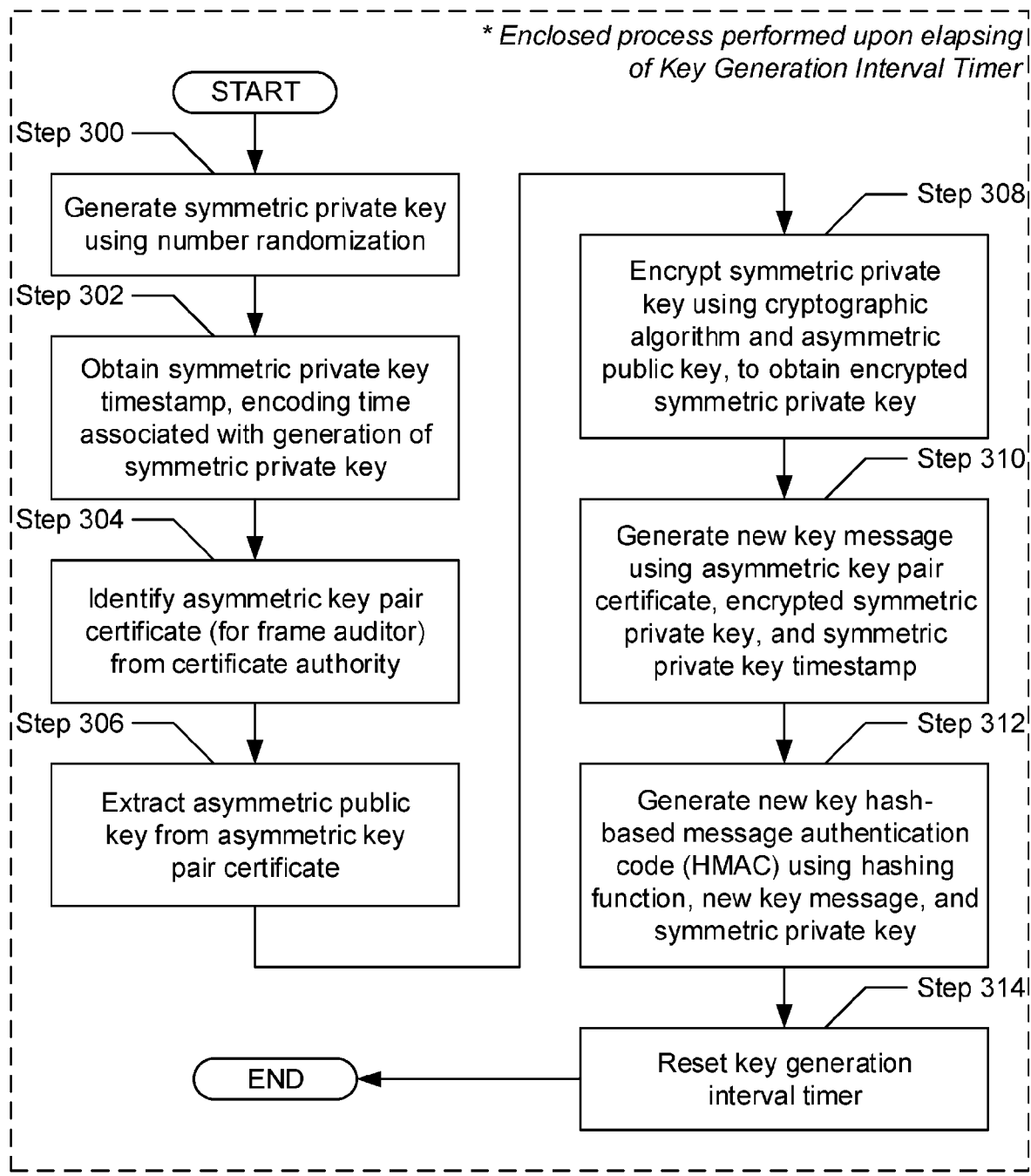
FIG. 3 shows a flowchart describing a method for generating a new key message and a new key hash-based message authentication code in accordance with one or more embodiments of the invention.

FIG. 3 shows a flowchart describing a method for generating a new key message and a new key hash-based message authentication code (HMAC) in accordance with one or more embodiments of the invention. The various steps outlined below may be performed by the frame signer (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, a performance of the various steps outlined below may be triggered each time a key generation interval timer elapses. In one embodiment of the invention, the key generation interval timer may represent a specialized clock mechanism used for measuring a specified time interval—e.g., a specified key generation time interval. The key generation time interval may be a programmable time interval, which may be defined by administrators of the frame signer. Further, the key generation interval timer may be implemented using a physical device (e.g., a precision oscillator), a logical intelligence (e.g., software), or a combination thereof. Moreover, the key generation interval timer may measure the specified key generation time interval by either: (a) counting upwards using discrete time units from zero until the key generation time interval is reached; or (b) counting downwards using discrete time units from the key generation time interval until zero is reached.

In Step 300, a symmetric private key is generated. In one embodiment of the invention, the symmetric private key may represent a shared secret key employed in a symmetric cryptographic algorithm. With respect to symmetric cryptography, the symmetric private key may be used to both: (a) encrypt plain-text data (i.e., unencrypted data) to obtain cipher-text data (i.e., encrypted data); and (b) decrypt cipher-text data, which may have been generated using the symmetric private key, to re-obtain the plain-text data. Further, the symmetric private key may encompass an arbitrary length string of random bits (i.e., binary digits) produced through any existing or future-developed pseudo random number generation (PRN G) algorithm.

In Step 302, a symmetric private key timestamp is obtained or generated. In one embodiment of the invention, the symmetric private key timestamp may represent encoded information (e.g., a sequence of characters—e.g., letters, numbers, symbols, etc.) identifying a precise date and/or time when the symmetric private key (generated in Step 300) had been generated. Further, the aforementioned precise data and/or time may be accurate up to the nanosecond (or picosecond) resolution, which may be achieved through the employment of the precision time protocol (PTP) and/or a global positioning system time (GPST) receiver.

In Step 304, an asymmetric key pair certificate is identified. In one embodiment of the invention, the asymmetric key pair certificate may represent a digital document that presents credentials for verifying the identity of the certificate owner—e.g., the frame auditor (see e.g., FIG. 1). More specifically, the asymmetric key pair certificate may represent a digital document that proves ownership of an asymmetric public key, which may be enclosed in the asymmetric key pair certificate. Generally, the asymmetric key pair certificate may also include various information describing the enclosed asymmetric public key and the certificate owner; and a digital signature associated with the certificate issuer—e.g., the certificate authority (see e.g., FIG. 1)—whom had verified the contents of the asymmetric key pair certificate. Further, the asymmetric key pair certificate may have been published (or provided for public accessibility) by the certificate issuer, which may have been sought and obtained, by the frame signer, prior to performance of the method disclosed in FIG. 3.

In Step 306, an asymmetric public key is extracted from the asymmetric key pair certificate (identified in Step 304). In one embodiment of the invention, the asymmetric public key may represent one of a pair of encryption keys employed in an asymmetric cryptographic algorithm. With respect to asymmetric cryptography, the asymmetric public key may be used to encrypt plain-text data (i.e., unencrypted data) to obtain cipher-text data (i.e., encrypted data).

In Step 308, an encrypted symmetric private key is obtained. Specifically, in one embodiment of the invention, the encrypted symmetric private key may be obtained through encryption of the symmetric private key (generated in Step 300) using an asymmetric cryptographic algorithm and the asymmetric public key (extracted from the asymmetric key pair certificate in Step 306). The aforementioned asymmetric cryptographic algorithm may refer to any existing or future developed asymmetric cryptographic algorithm (e.g., the Rivest-Shamir-Adleman (RSA) public-key encryption algorithm).

In Step 310, a new key message is generated. In one embodiment of the invention, the new key message may represent plain-text data pending cryptographic processing. Specifically, the new key message may encompass a concatenation of the bytes representative of the asymmetric key pair certificate (identified in Step 304), the encrypted symmetric private key (obtained in Step 308), and the symmetric private key timestamp (obtained/generated in Step 302).

In Step 312, a new key hash-based message authentication code (HMAC) is generated. In one embodiment of the invention, the new key HMAC may represent a hash value or digest used in the verification of the data integrity, and the authentication, of the new key message (generated in Step 310). Accordingly, generation of the new key HMAC may entail using a cryptographic hashing function, the new key message, and the symmetric private key (generated in Step 300). Further, the aforementioned cryptographic hashing function may refer to any existing or future developed cryptographic hashing function (e.g., any one of the Secure Hash Algorithm 2 (SHA-2) family of cryptographic hash functions).

In Step 314, the key generation interval timer (described above) is reset. In one embodiment of the invention, resetting the key generation interval timer may entail re-initializing a starting time value of the key generation interval timer to zero, wherefrom a count-up, using discrete time units until the key generation time interval, proceeds. In another embodiment of the invention, resetting the key generation interval timer may alternatively entail re-initializing the starting time value of the key generation interval timer to the key generation time interval, wherefrom a count-down, using discrete time units until a value of zero, proceeds.

Figure 4A:
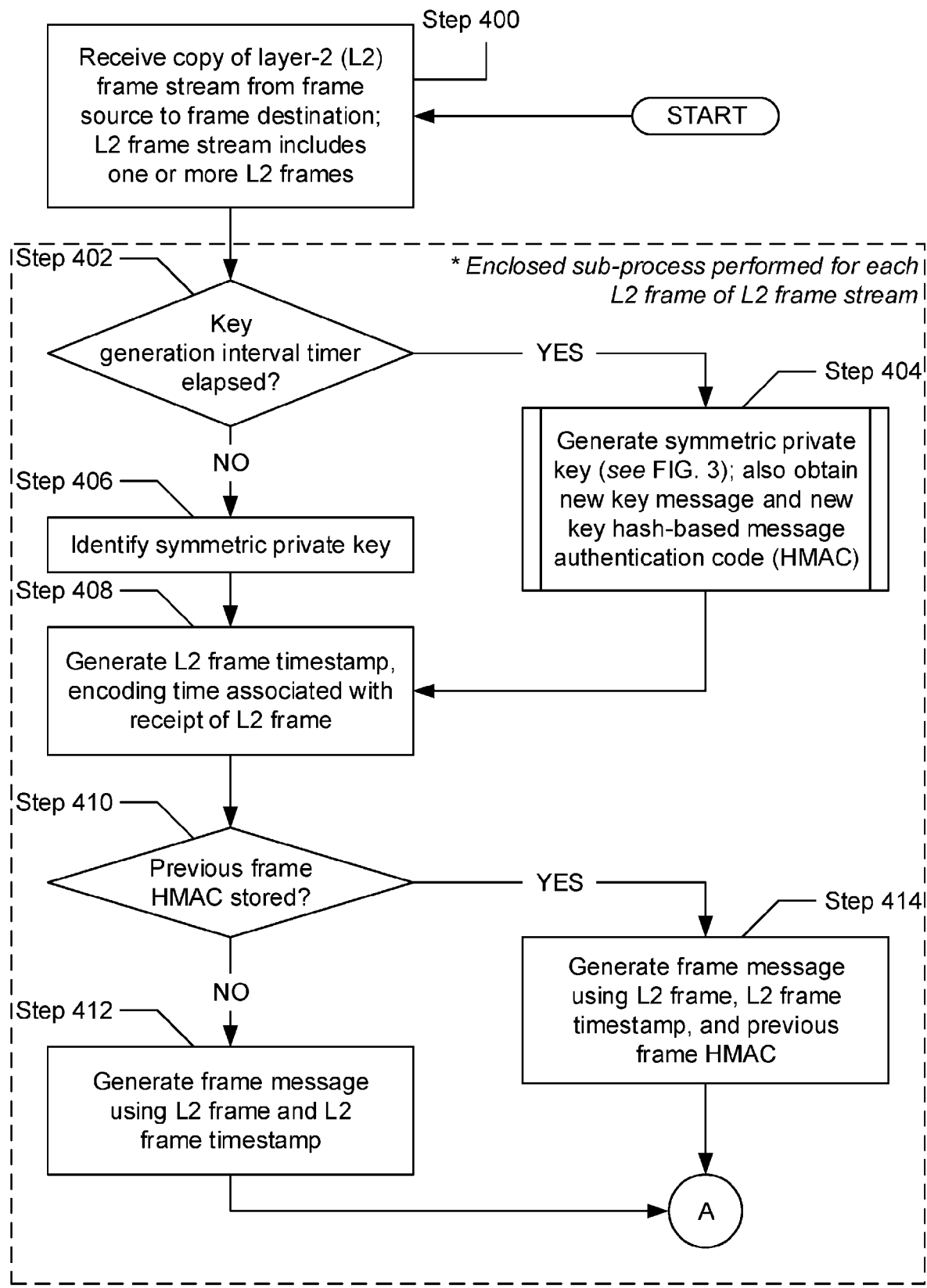
FIGS. 4A and 4B show flowcharts describing a method for generating verifiable network traffic in accordance with one or more embodiments of the invention.
Figure 4B:
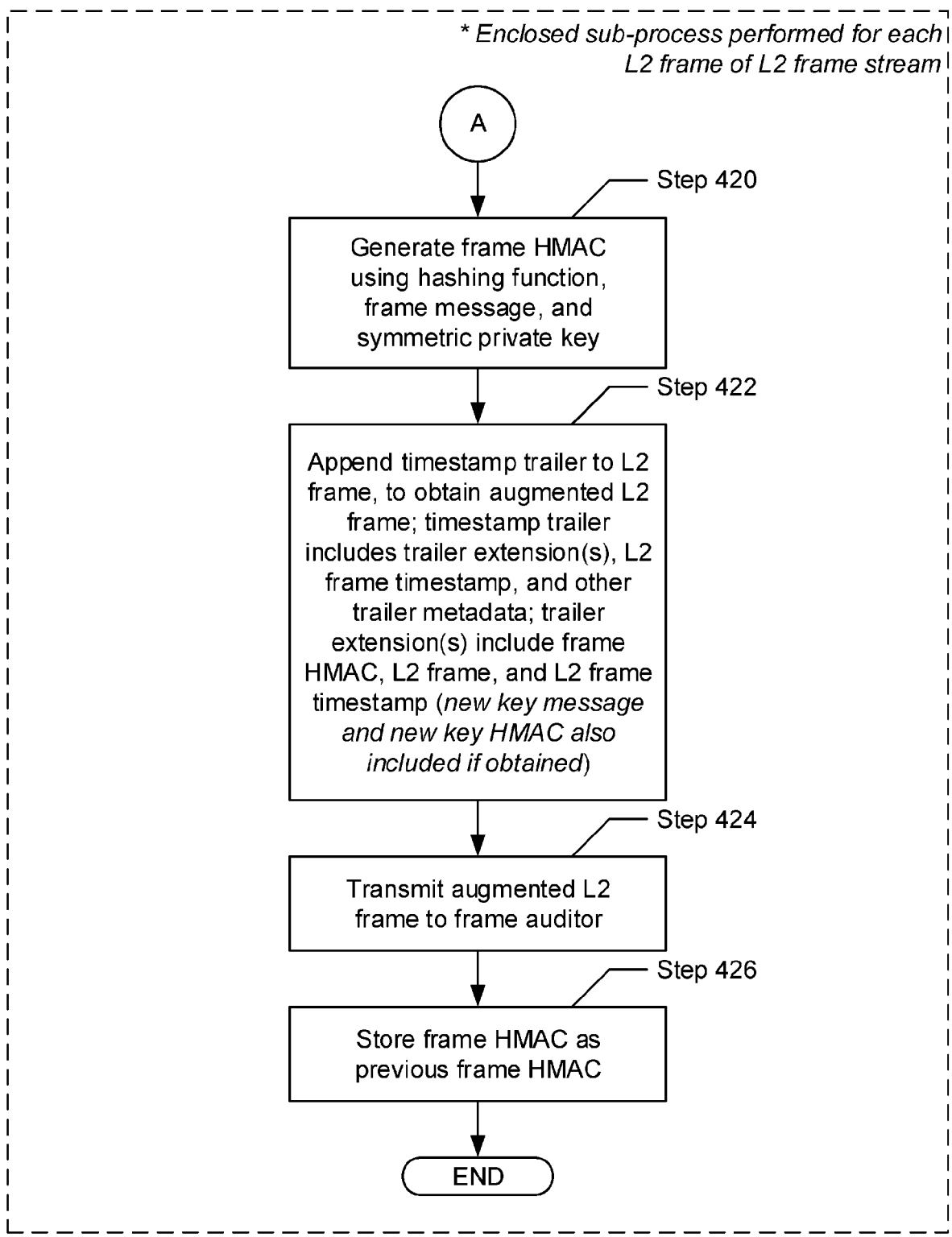

FIGS. 4A and 4B show flowcharts describing a method for generating verifiable network traffic in accordance with one or more embodiments of the invention. The various steps outlined below may be performed by the frame signer (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

In Step 400, a copy of a layer-2 (L2) frame stream is received. In one embodiment of the invention, the received copy of the L2 frame stream may have arrived, through a network, from a network splitter (described above) (see e.g., FIG. 1), which would have replicated network traffic—e.g., an original L2 frame stream—between a frame source and frame destination. Further, the received copy of the L2 frame stream (also referred hereinafter as L2 frame stream because the received copy of the L2 frame stream and the original L2 frame stream are identical) may represent a sequence of one or more L2 frames (see e.g., FIG. 2A).

Hereinafter, the various remaining steps outlined below may be performed for each L2 frame of the L2 frame stream (received in Step 400). That is, the performance of the various remaining steps outlined below may be triggered upon the receipt or arrival of each individual L2 frame of the L2 frame stream.

In Step 402, a determination is made as to whether a key generation interval timer has elapsed. The key generation interval timer may represent a specialized clock mechanism used for measuring a specified time interval—e.g., a specified key generation time interval. The key generation time interval may be a programmable time interval, which may be defined by administrators of the frame signer. Further, the key generation interval timer may be implemented using a physical device (e.g., a precision oscillator), a logical intelligence (e.g., software), or a combination thereof. Moreover, the key generation interval timer may measure the specified key generation time interval by either: (a) counting upwards using discrete time units from zero until the key generation time interval is reached: or (b) counting downwards using discrete time units from the key generation time interval until zero is reached. Accordingly, in one embodiment of the invention, if it is determined that the key generation interval timer has elapsed, then the process may proceed to Step 404.

On the other hand, in another embodiment of the invention, if it is alternatively determined that the key generation interval timer has not yet elapsed, then the process may alternatively proceed to Step 406.

In Step 404, after determining (in Step 402) that the key generation interval timer has elapsed, a symmetric private key is generated. In one embodiment of the invention, generation of the symmetric private key may transpire to replace an existing (expiring) symmetric private key. Further, the symmetric private key may represent a shared secret key employed in a symmetric cryptographic algorithm. With respect to symmetric cryptography, the symmetric private key may be used to both: (a) encrypt plain-text data (i.e., unencrypted data) to obtain cipher-text data (i.e., encrypted data); and (b) decrypt cipher-text data, which may have been generated using the symmetric private key, to re-obtain the plain-text data. Moreover, in generating the symmetric private key, a new key message and a new key hash-based message authentication code (HMAC) may be obtained (see e.g., FIG. 3). Hereinafter, the process may proceed to Step 408.

In Step 406, after alternatively determining (in Step 402) that the key generation interval timer has not yet elapsed, a symmetric private key is identified. In one embodiment of the invention, the symmetric private key may represent an existing (yet to expire) symmetric private key, which may have been generated when a previous key generation interval timer instance had elapsed.

In Step 408, an L2 frame timestamp is generated. In one embodiment of the invention, the L2 frame timestamp may represent encoded information (e.g., a sequence of characters—e.g., letters, numbers, symbols, etc.) identifying a precise date and/or time when the L2 frame (i.e., the current L2 frame being processed of the L2 frame stream) had been received. Further, the aforementioned precise data and/or time may be accurate up to the nanosecond (or picosecond) resolution, which may be achieved through the employment of the precision time protocol (PTP) and/or a global positioning system time (GPST) receiver.

In Step 410, a determination is made as to whether a previous frame HMAC is stored. A previous frame HMAC may represent a hash value or digest used in the verification of the data integrity, and the authentication, of a previous frame message (described below), which may have been generated during the processing of a previous L2 frame of the L2 frame stream. Accordingly, in one embodiment of the invention, if the current L2 frame being processed is a first L2 frame (to be processed) of the L2 frame stream (received in Step 400), then it may be determined that a previous frame HMAC has not been stored and, subsequently, the process may proceed to Step 412. On the other hand, in another embodiment of the invention, if the current L2 frame being processed is not the first L2 frame (to be processed) of the L2 frame stream, then it may be alternatively determined that a previous frame HMAC has been stored and, subsequently, the process may alternatively proceed to Step 414.

In Step 412, after determining (in Step 410) that a previous frame HMAC has not been stored, a frame message is generated. In one embodiment of the invention, the frame message may represent plain-text data pending cryptographic processing. Specifically, the frame message may encompass a concatenation of the bytes representative of the L2 frame (i.e., the current L2 frame being processed of the L2 frame stream) and the L2 frame timestamp (generated in Step 408).

In Step 414, after alternatively determining (in Step 410) that a previous frame HMAC (associated with a previously processed L2 frame of the L2 frame stream) has been stored, a frame message is generated. In one embodiment of the invention, the frame message may represent plain-text data pending cryptographic processing. Specifically, the frame message may encompass a concatenation of bytes representative of the L2 frame (i.e., the current L2 frame being processed of the L2 frame stream), the L2 frame timestamp (generated in Step 408), and the previous frame HMAC (determined to have been stored in Step 410).

Turning to FIG. 4B, in Step 420, following the generation of the frame message (either in Step 412 or Step 414), a frame HMAC is generated. In one embodiment of the invention, the frame HMAC may represent a hash value or digest used in the verification of the data integrity, and the authentication, of the frame message. Accordingly, generation of the frame HMAC may entail using a cryptographic hashing function, the frame message, and the symmetric private key (either generated in Step 404 or identified in Step 406). Further, the aforementioned cryptographic hashing function may refer to any existing or future developed cryptographic hashing function (e.g., any one of the Secure Hash Algorithm 2 (SHA-2) family of cryptographic hash functions).

In Step 422, a timestamp trailer is appended to the L2 frame (i.e., the current L2 frame being processed of the L2 frame stream) to obtain an augmented L2 frame (see e.g., FIG. 2B). In one embodiment of the invention, the timestamp trailer may collectively represent various information detailing the verifiable network traffic generation process—e.g., the method disclosed in FIGS. 4A and 4B. Specifically, the timestamp trailer may encompass one or more trailer extensions, time information, one or more trailer flags, port identification information, device identification information, and frame sequence number information (all described above with respect to FIG. 2B). Further, in one embodiment of the invention, the trailer extension(s) may collectively enclose the frame HMAC (generated in Step 420), the L2 frame (i.e., the current L2 frame being processed of the L2 frame stream), and the L2 frame timestamp (generated in Step 408). In another embodiment of the invention, the trailer extension(s) may also collectively enclose the new key message and the new key HMAC (obtained in Step 404) had it been determined (in Step 402) that the key generation interval timer had elapsed.

In Step 424, the augmented L2 frame (obtained in Step 422) is transmitted. In one embodiment of the invention, the augmented L2 frame may be transmitted, across a network, to the frame auditor (see e.g., FIG. 1). Thereafter, in Step 426, the frame HMAC (generated in Step 420) is stored as the previous frame HMAC, which may be employed during the processing of a next L2 frame (if any) of the L2 frame stream (received in Step 400). Afterwards, the process ends (at least for the current L2 frame being processed of the L2 frame stream).

Figure 5A:
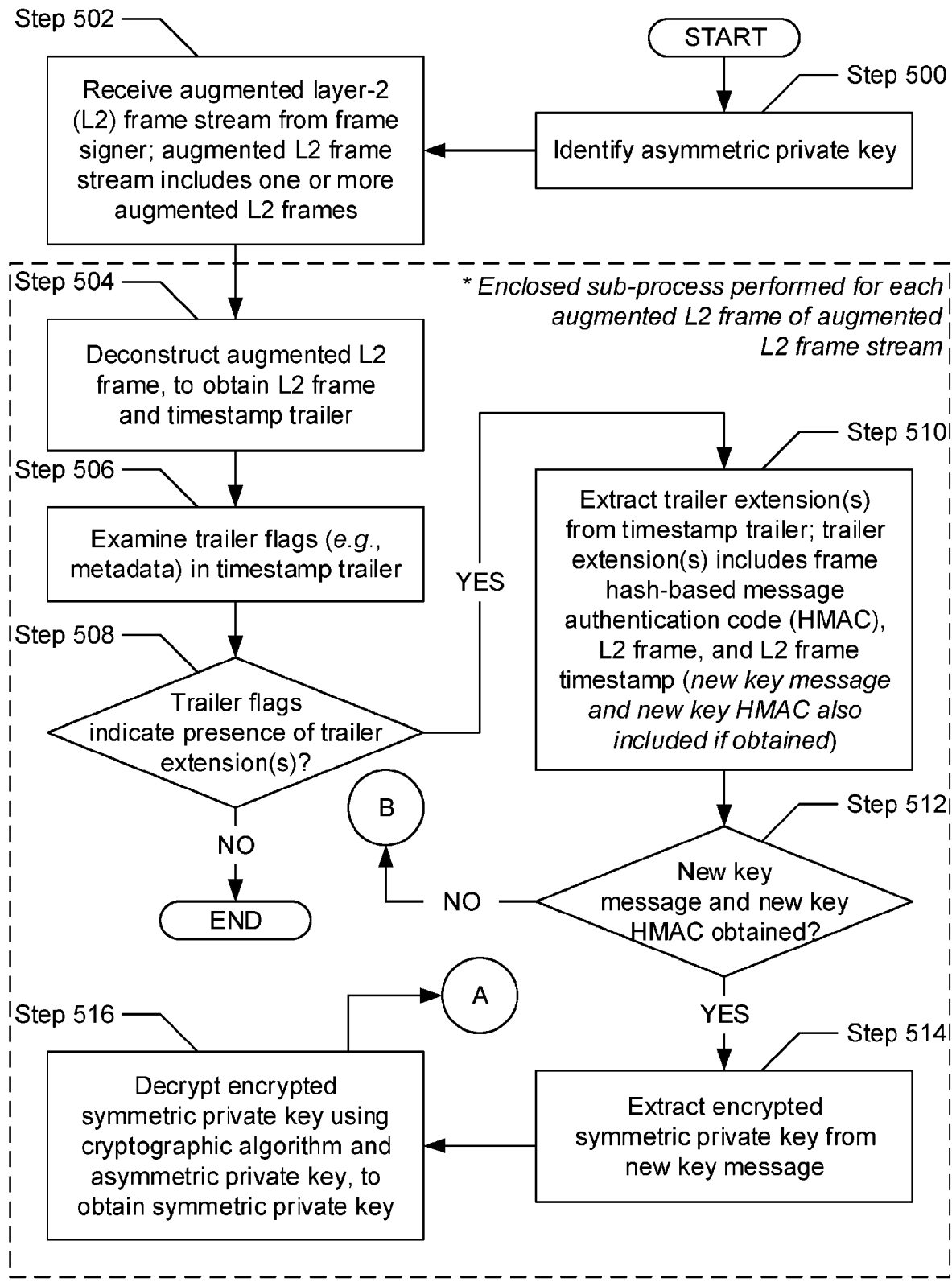
FIGS. 5A and 5B show flowcharts describing a method for authenticating verifiable network traffic in accordance with one or more embodiments of the invention.
Figure 5B:
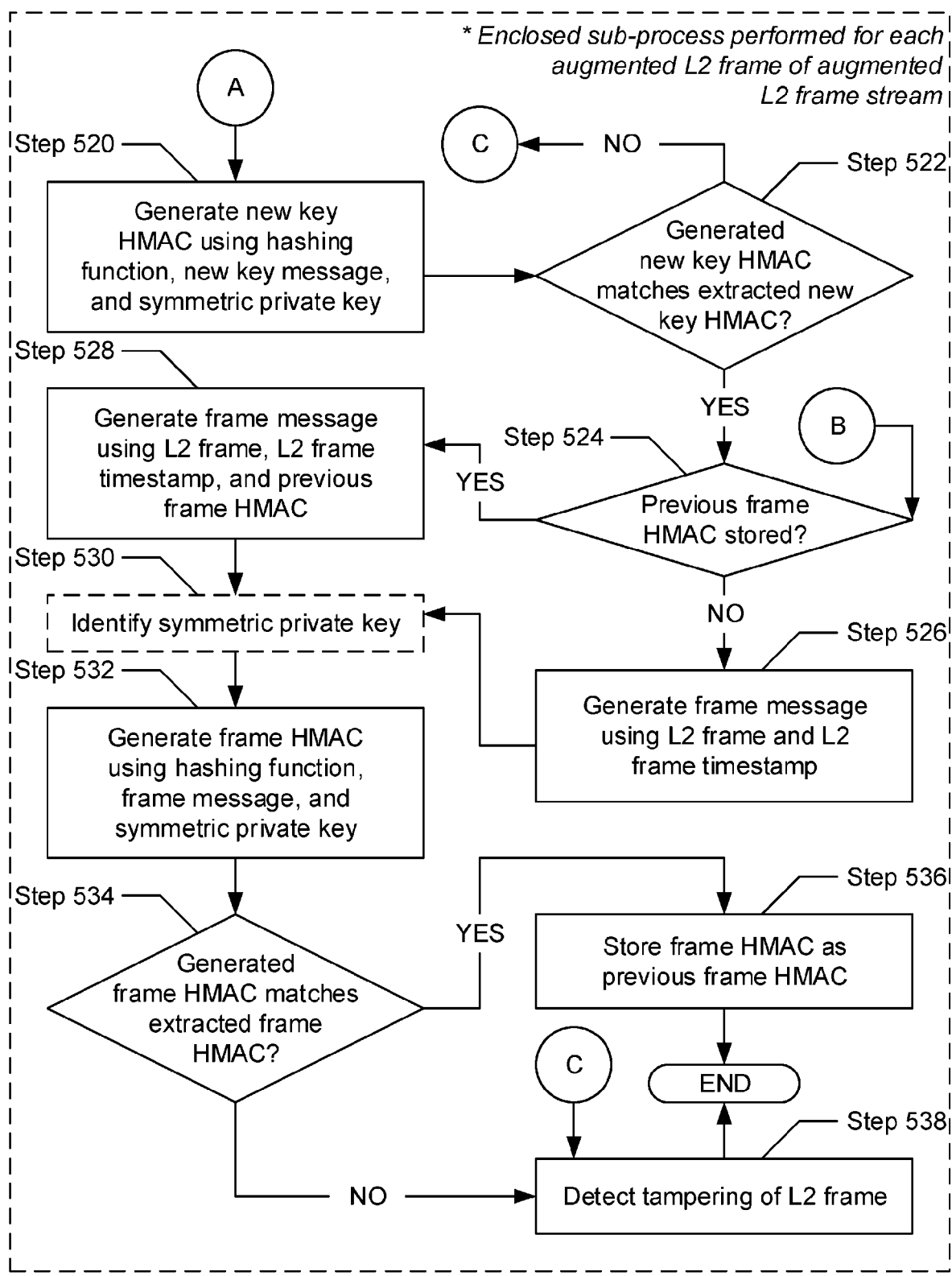

FIGS. 5A and 5B show flowcharts describing a method for authenticating verifiable network traffic in accordance with one or more embodiments of the invention. The various steps outlined below may be performed by the frame auditor (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

In Step 500, an asymmetric private key is identified. In one embodiment of the invention, the asymmetric private key may represent one of a pair of encryption keys employed in an asymmetric cryptographic algorithm. With respect to asymmetric cryptography, the asymmetric private key may be used to decrypt cipher-text data (i.e., encrypted data) to obtain plain-text data (i.e., unencrypted data). Further, the asymmetric private key may mathematically relate to an opposing asymmetric public key, which may be employed in the asymmetric cryptographic algorithm to encrypt the plain-text data to obtain the cipher-text data. Moreover, while the asymmetric public key may be published to the public and, thus, widely-known, the asymmetric private key may only be known to the key owner—e.g., the frame auditor.

In Step 502, an augmented layer-2 (L2) frame stream is received. In one embodiment of the invention, the received augmented L2 frame stream may have arrived, through a network, from the frame signer (see e.g., FIG. 1). Further, the received augmented L2 frame stream may represent a sequence of one or more augmented L2 frames (see e.g., FIG. 2B).

Hereinafter, the various remaining steps outlined below may be performed for each augmented L2 frame of the augmented L2 frame stream (received in Step 500). That is, the performance of the various remaining steps outlined below may be triggered upon the receipt or arrival of each individual augmented L2 frame of the augmented L2 frame stream.

In Step 504, the augmented L2 frame (i.e., the current augmented L2 frame being processed of the augmented L2 frame stream) is deconstructed. Specifically, in one embodiment of the invention, the augmented L2 frame may be deconstructed into a L2 frame (see e.g., FIG. 2A) and a timestamp trailer. The timestamp trailer may collectively represent various information detailing the verifiable network traffic generation process—e.g., the method disclosed in FIGS. 4A and 4B. Specifically, the timestamp trailer may encompass zero or more trailer extensions, time information, one or more trailer flags, port identification information, device identification information, and frame sequence number information (all described above with respect to FIG. 2B). Further, deconstruction of the augmented L2 frame may employ any existing or future developed data parsing algorithm.

In Step 506, the trailer flags field of the timestamp trailer (obtained in Step 504) is examined. In one embodiment of the invention, the trailer flags field may encompass a collection of bits (i.e., binary digits), where each subset of one or more bits may reflect a state descriptive of another field in the L2 frame (also obtained in Step 504) and/or the timestamp trailer. By way of an example, one bit of the trailer flags field, positioned at a predetermined bit location, may be used to indicate whether the timestamp trailer includes at least one trailer extension (described above)—e.g., a binary digit of '1' may indicate that the timestamp trailer does include at least one trailer extension, whereas a binary digit of '0' may alternatively indicate that the timestamp trailer does not include any trailer extensions.

In Step 508, a determination is made as to whether the trailer flag field (examined in Step 506) reflects a presence of at least one trailer extension enclosed in the timestamp trailer (obtained in Step 504). In one embodiment of the invention, if it is determined that the above-mentioned examination indicates that the timestamp trailer does include at least one trailer extension, then the process may proceed to Step 510. On the other hand, in another embodiment of the invention, if it is alternatively determined that the above-mentioned examination indicates that the timestamp trailer does not include any trailer extensions, then the process ends (at least for the current augmented L2 frame being processed of the augmented L2 frame stream).

In Step 510, after determining (in Step 508) that the timestamp trailer (obtained in Step 504) includes at least one trailer extension (see e.g., FIG. 2B), the trailer extension(s) is/are extracted from the timestamp trailer. In one embodiment of the invention, the timestamp trailer may subsequently be deconstructed (or parsed) to obtain a frame hash-based message authentication code (HMAC), the L2 frame (also obtained in Step 504), and an L2 frame timestamp for the L2 frame. The frame HMAC may represent a hash value or digest used in the verification of the data integrity, and the authentication, of a frame message (associated with and produced, at least in part, using the L2 frame during the verifiable network traffic generation process— e.g., the method disclosed in FIGS. 4A and 4B). Meanwhile, the L2 frame timestamp may represent encoded information (e.g., a sequence of characters—e.g., letters, numbers, symbols, etc.) identifying a precise date and/or time when the L2 frame had been received by the frame signer. Moreover, in another embodiment of the invention, deconstruction (or parsing) of the timestamp trailer may additionally yield the obtaining of a new key message and a new key HMAC (described above) (see e.g., FIG. 3).

In Step 512, a determination is made as to whether a new key message and a new key HMAC had been obtained from deconstructing the trailer extension(s) (extracted from the timestamp trailer in Step 510). In one embodiment of the invention, if it is determined that a new key message and a new key HMAC had been obtained, then the process may proceed to Step 514. On the other hand, in another embodiment of the invention, if it is alternatively determined that a new key message and a new key HMAC had not been obtained, then the process may alternatively proceed to Step 524 (see e.g., FIG. 5B).

In Step 514, after determining (in Step 512) that a new key message and a new key HMAC had been obtained from deconstruction of the trailer extension(s) (extracted in Step 510), an encrypted symmetric private key is extracted from the new key message. In one embodiment of the invention, the new key message may encompass a concatenation of the bytes representative of an asymmetric key pair certificate, the encrypted symmetric private key, and a symmetric private key timestamp. The asymmetric key pair certificate may represent a digital document that presents credentials for verifying the identity of the certificate owner—e.g., the frame auditor. The encrypted symmetric private key may represent cipher-text data obtained by way of an asymmetric cryptographic algorithm and an asymmetric public key. Further, the symmetric private key timestamp may represent encoded information (e.g., a sequence of characters—e.g., letters, numbers, symbols, etc.) identifying a precise date and/or time when a symmetric private key had been generated by the frame signer. Extraction of the asymmetric key pair certificate, the encrypted symmetric private key, and the symmetric private key timestamp may entail employing any existing or future developed data parsing algorithm.

In Step 516, the encrypted symmetric private key (extracted from the new key message in Step 514) is decrypted. Specifically, in one embodiment of the invention, the encrypted symmetric private key may be decrypted to obtain a symmetric private key. The decryption may entail using an asymmetric cryptographic algorithm along with the asymmetric private key (identified in Step 500). The aforementioned asymmetric cryptographic algorithm may refer to any existing or future developed asymmetric cryptographic algorithm (e.g., the Rivest-Shamir-Adleman (RSA) public-key encryption algorithm). Further, the obtained symmetric private key may represent a shared secret key employed in a symmetric cryptographic algorithm. With respect to symmetric cryptography, the symmetric private key may be used to both: (a) encrypt plain-text data (i.e., unencrypted data) to obtain cipher-text data (i.e., encrypted data); and (b) decrypt cipher-text data, which may have been generated using the symmetric private key, to re-obtain the plain-text data.

Turning to FIG. 5B, in Step 520, following the decryption of the encrypted symmetric private key to obtain the symmetric private key (in Step 516), a new key HMAC is generated. In one embodiment of the invention, the new key HMAC may represent a hash value or digest used in the verification of the data integrity, and the authentication, of the new key message (determined to have been obtained from the trailer extension(s) in Step 512). Accordingly, generation of the new key HMAC may entail using a cryptographic hashing function, the new key message, and the symmetric private key (obtained in Step 516). Further, the aforementioned cryptographic hashing function may refer to any existing or future developed cryptographic hashing function (e.g., any one of the Secure Hash Algorithm 2 (SHA-2) family of cryptographic hash functions.

In Step 522, a determination is made as to whether the new key HMAC (generated in Step 520) matches the new key HMAC (determined to have been obtained from the trailer extension(s) in Step 512). In one embodiment of the invention, if it is determined that both new key HMACs match, then a data integrity and authenticity of the new key message is verified and, subsequently, the process may proceed to Step 524. On the other hand, if it is alternatively determined that both new key HMACs mismatch, then the data integrity and/or authenticity of the new key message reflects a breach and, subsequently, the process may alternatively proceed to Step 538.

In Step 524, after determining (in Step 522) that the new key HMAC (generated in Step 520) matches the new key HMAC (determined to have been obtained from the trailer extension(s) in Step 512), a determination is made as to whether a previous frame HMAC is stored. A previous frame HMAC may represent a hash value or digest used in the verification of the data integrity, and the authentication, of a previous frame message (described below), which may have been generated during the processing of a previous augmented L2 frame of the augmented L2 frame stream. Accordingly, in one embodiment of the invention, if the current augmented L2 frame being processed is a first augmented L2 frame (to be processed) of the augmented L2 frame stream (received in Step 502), then it may be determined that a previous frame HMAC has not been stored and, subsequently, the process may proceed to Step 526. On the other hand, in another embodiment of the invention, if the current augmented L2 frame being processed is not the first augmented L2 frame (to be processed) of the augmented L2 frame stream, then it may be alternatively determined that a previous frame HMAC has been stored and, subsequently, the process may alternatively proceed to Step 528.

In Step 526, after determining (in Step 524) that a previous frame HMAC has not been stored, a frame message is generated. In one embodiment of the invention, the frame message may represent plain-text data pending cryptographic processing. Specifically, the frame message may encompass a concatenation of the bytes representative of the L2 frame (obtained from the deconstruction of the augmented L2 frame in Step 504 or from the deconstruction of the trailer extension(s) in Step 510) and the L2 frame timestamp (again obtained either from Step 504 or Step 510). Hereinafter, the process may proceed to Step 530.

In Step 528, after alternatively determining (in Step 524) that a previous frame HMAC (associated with a previously processed augmented L2 frame of the augmented L2 frame stream) has been stored, a frame message is generated. In one embodiment of the invention, the frame message may represent plain-text data pending cryptographic processing. Specifically, the frame message may encompass a concatenation of bytes representative of the L2 frame (obtained either through Step 504 or Step 510), the L2 frame timestamp (again obtained either through Step 504 or Step 510), and the previous frame HMAC (determined to have been stored in Step 524).

In Step 530, following the generation of the frame message (in Step 526 or Step 528), a symmetric private key may or may not be identified. That is, in one embodiment of the invention, had it been determined (in Step 512) that at least a new key message had been obtained, then the symmetric private key may not be identified because the symmetric private key has already been obtained through decryption of the encrypted symmetric private key (in Step 516). However, in another embodiment of the invention, had it been alternatively determined (in Step 512) that a new key message had not been obtained, then it logically follows that the symmetric private key would not have been obtained through the aforementioned decryption of the encrypted symmetric private key. Accordingly, in such an embodiment, the symmetric private key may alternatively be identified. Further, as a point of comparison: (a) the symmetric key obtained through decryption (in Step 516) may represent a replacement for an existing (expiring) symmetric private key; whereas (b) the symmetric key (identified in Step 530) may represent an existing (yet to expire) symmetric private key.

In Step 532, a frame HMAC is generated. In one embodiment of the invention, the frame HMAC may represent a hash value or digest used in the verification of the data integrity, and the authentication, of the frame message. Accordingly, generation of the frame HMAC may entail using a cryptographic hashing function, the frame message (generated in either Step 526 or Step 528), and the symmetric private key (obtained in Step 516 or identified in Step 530). Further, the aforementioned cryptographic hashing function may refer to any existing or future developed cryptographic hashing function (e.g., any one of the Secure Hash Algorithm 2 (SHA-2) family of cryptographic hash functions).

In Step 534, a determination is made as to whether the frame HMAC (generated in Step 532) matches the frame HMAC (determined to have been obtained from the trailer extension(s) in Step 512). In one embodiment of the invention, if it is determined that both frame HMACs match, then a data integrity and authenticity of the frame message is verified and, subsequently, the process may proceed to Step 536. On the other hand, if it is alternatively determined that both frame HMACs mismatch, then the data integrity and/or authenticity of the frame message reflects a breach and, subsequently, the process may alternatively proceed to Step 538.

In Step 536, after determining (in Step 534) that the frame HMAC (generated in Step 532) matches the frame HMAC (determined to have been obtained from trailer extension(s) in Step 512), the frame HMAC (generated in Step 532) is stored as the previous frame HMAC. In one embodiment of the invention, the stored frame HMAC may be employed during the processing of a next augmented L2 frame (if any) of the augmented L2 frame stream (received in Step 502). Hereinafter, the process ends (at least for the current augmented L2 frame being processed of the augmented L2 frame stream).

In Step 538, after alternatively determining (in Step 522) that the new key HMAC (generated in Step 520) mismatches the new key HMAC (determined to have been obtained from the trailer extension(s) in Step 512), or after alternatively determining (in Step 534) that the frame HMAC (generated in Step 532) mismatches the frame HMAC (determined to have been obtained from the trailer extension(s) in Step 512), evidence of network traffic tampering is detected. Based on the detection, in one embodiment of the invention, an alert may be issued and presented to operators and/or administrators of the frame auditor, whom may disclose the tampering and/or impose punitive action(s) on the operators and/or administrators of the frame signer. Further, based on the aforementioned detection, the overall processing of the augmented L2 frame stream may be aborted.

Figure 6A:
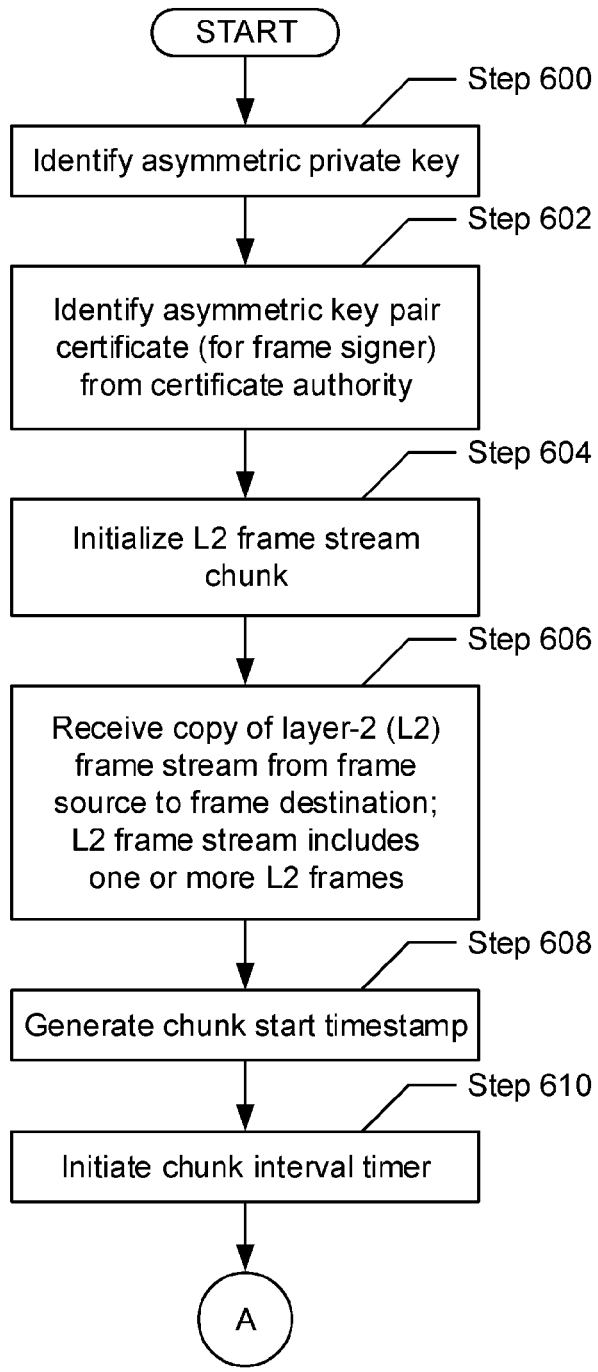
FIGS. 6A-6C show flowcharts describing a method for generating verifiable network traffic in accordance with one or more embodiments of the invention.
Figure 6B:
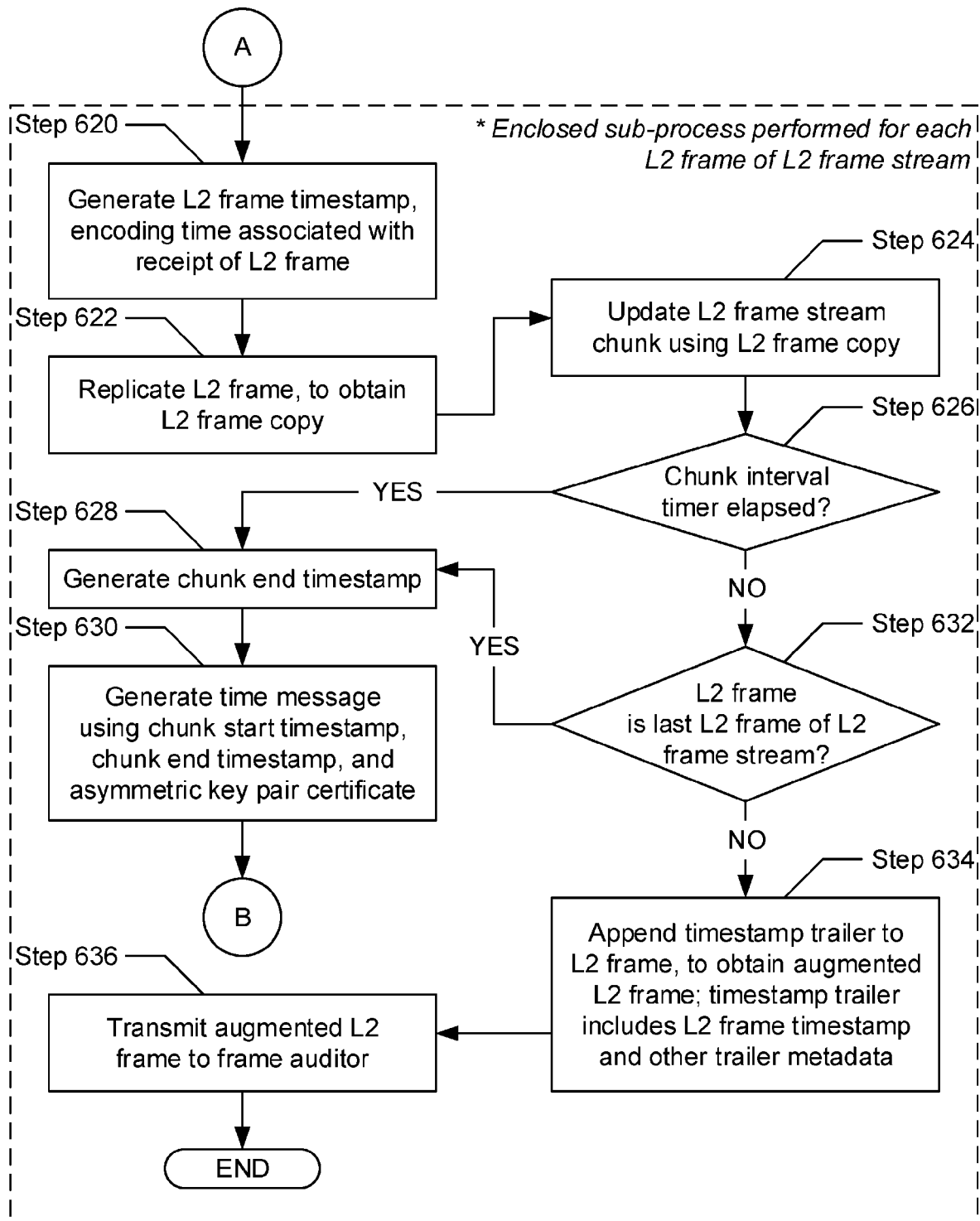
Figure 6C:
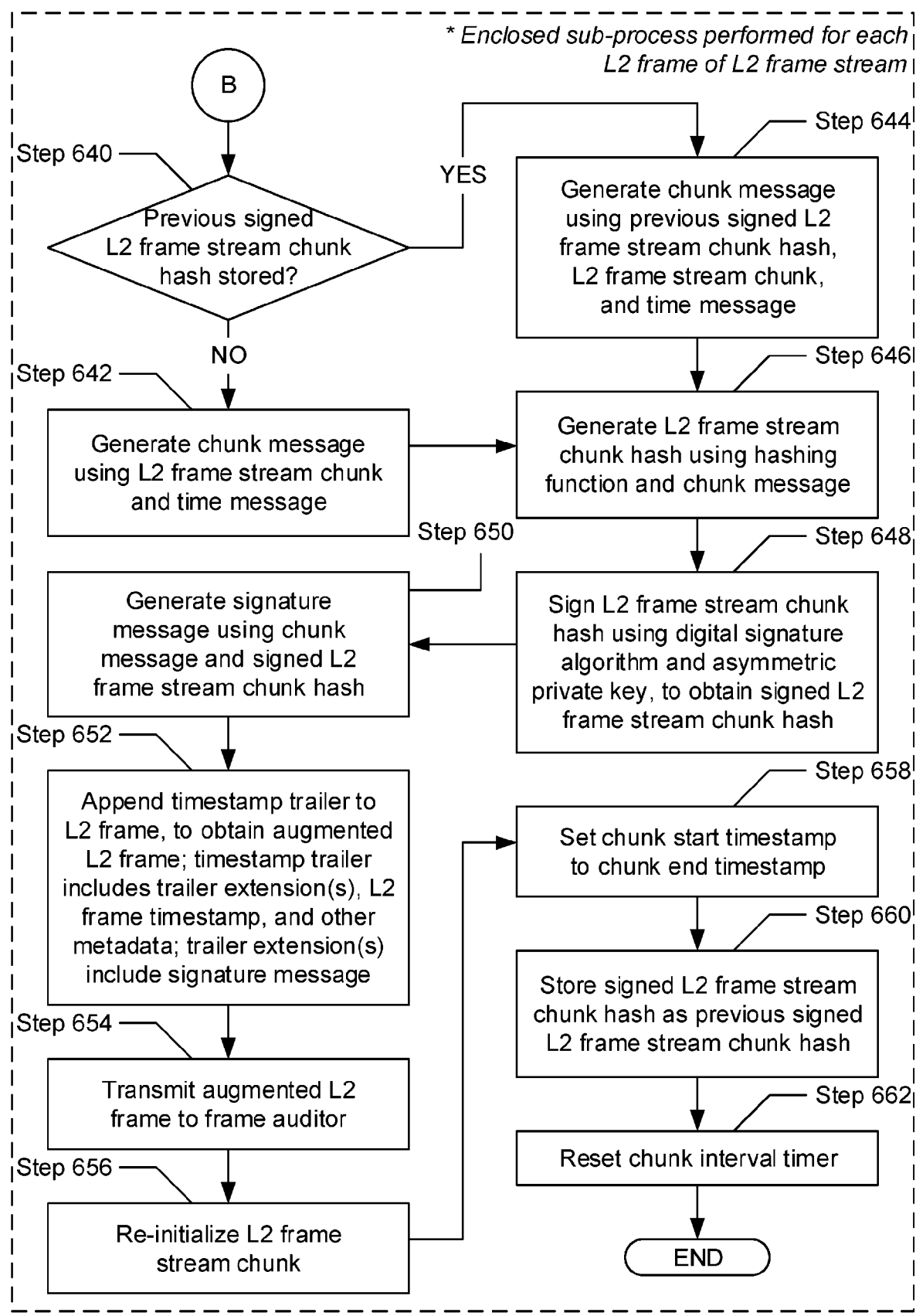

FIGS. 6A-6C show flowcharts describing a method for generating verifiable network traffic in accordance with one or more embodiments of the invention. The various steps outlined below may be performed by the frame signer (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, an asymmetric private key is identified. In one embodiment of the invention, the asymmetric private key may represent one of a pair of encryption keys employed in a digital signature algorithm. With respect to digital signing, the asymmetric private key may be used to encrypt plain-text data (i.e., unencrypted data) to obtain a digital signature (i.e., encrypted data). Further, the asymmetric private key may mathematically relate to an opposing asymmetric public key, which may be employed in the digital signature algorithm to decrypt the digital signature to obtain the plain-text data. Moreover, while the asymmetric public key may be published to the public and, thus, widely-known, the asymmetric private key may only be known to the key owner—e.g., the frame signer.

In Step 602, an asymmetric key pair certificate is identified. In one embodiment of the invention, the asymmetric key pair certificate may represent a digital document that presents credentials for verifying the identity of the certificate owner—e.g., the frame signer. More specifically, the asymmetric key pair certificate may represent a digital document that proves ownership of an asymmetric public key, which may be enclosed in the asymmetric key pair certificate. Generally, the asymmetric key pair certificate may also include various information describing the enclosed asymmetric public key and the certificate owner; and a digital signature associated with the certificate issuer—e.g., the certificate authority (see e.g., FIG. 1)—whom had verified the contents of the asymmetric key pair certificate. Further, the asymmetric key pair certificate may have been provided to the frame signer, by the certificate authority, in response to a request for its generation and issuance, which may have been sought and fulfilled prior to the performance of the method disclosed in FIGS. 6A and 6B.

In Step 604, a layer-2 (L2) frame stream chunk is initialized. In one embodiment of the invention, the L2 frame stream chunk may represent a data object (e.g., a bit string variable) used for storing the byte(s) of information representative of an arbitrary portion of a L2 frame stream. A L2 frame stream may represent any single transmission of data from one entity to another (e.g., from the frame signer to the frame destination), which may encompass one or more L2 frames (see e.g., FIG. 2A). Accordingly, the L2 frame stream chunk may be used throughout the various steps outlined below to store one or more segments of a L2 frame stream, where each defined segment (or chunk) may include one or more L2 frames (e.g., an arbitrary subset of the total L2 frame count) of the L2 frame stream being processed. Further, initialization of the L2 frame stream chunk may entail allocation of an empty, arbitrary length bit string in memory.

In one embodiment of the invention, each L2 frame stream chunk may encompass one or more L2 frames of a L2 frame stream, which may have been received within a specified time interval—e.g., a specified chunk time interval. Subsequently, each L2 frame stream chunk may be further defined or associated with a chunk start timestamp and a chunk end timestamp, which reflect the time boundaries between which the L2 frame(s) of a given L2 frame stream chunk had been received. Therefore, a receipt-based timestamp for each L2 frame of a given L2 frame stream chunk may lie within or between the determined chunk start and end timestamps for the given L2 frame stream chunk. Furthermore, should a L2 frame stream span multiple L2 frame stream chunks, the chunk start timestamp of each successive L2 frame stream chunk may equal the chunk end timestamp of the previous L2 frame stream chunk.

In Step 606, a copy of a L2 frame stream is received. In one embodiment of the invention, the received copy of the L2 frame stream may have arrived, through a network, from a network splitter (described above) (see e.g., FIG. 1), which would have replicated network traffic—e.g., an original L2 frame stream—between a frame source and frame destination. Further, the received copy of the L2 frame stream (also referred hereinafter as L2 frame stream because the received copy of the L2 frame stream and the original L2 frame stream are identical) may represent a sequence of one or more L2 frames (see e.g., FIG. 2A).

In Step 608, a chunk start timestamp is generated. In one embodiment of the invention, the chunk start timestamp may represent encoded information (e.g., a sequence of characters—e.g., letters, numbers, symbols, etc.) identifying a precise date and/or time reflective of a starting time boundary defining the L2 frame stream chunk (initialized in Step 604). Further, the aforementioned precise data and/or time may be accurate up to the nanosecond (or picosecond) resolution, which may be achieved through the employment of the precision time protocol (PTP) and/or a global positioning system time (GPST) receiver.

In Step 610, a chunk interval timer is initiated. In one embodiment of the invention, the chunk interval timer may represent a specialized clock mechanism used for measuring a specified time interval—e.g., a specified chunk time interval. The chunk time interval may be a programmable time interval, which may be defined by administrators of the frame signer. Further, the chunk interval timer may be implemented using a physical device (e.g., a precision oscillator), a logical intelligence (e.g., software), or a combination thereof. Moreover, the chunk interval timer may measure the specified chunk time interval by either: (a) counting upwards using discrete time units from zero until the chunk time interval is reached; or (b) counting downwards using discrete time units from the chunk time interval until zero is reached.

Turning to FIG. 6B, hereinafter, the various remaining steps outlined below may be performed for each L2 frame of the L2 frame stream (received in Step 606). That is, the performance of the various remaining steps outlined below may be triggered upon the receipt or arrival of each individual L2 frame of the L2 frame stream.

In Step 620, a L2 frame timestamp is generated. In one embodiment of the invention, the L2 frame timestamp may represent encoded information (e.g., a sequence of characters—e.g., letters, numbers, symbols, etc.) identifying a precise date and/or time when the L2 frame (i.e., the current L2 frame being processed of the L2 frame stream) had been received. Further, the aforementioned precise data and/or time may be accurate up to the nanosecond (or picosecond) resolution, which may be achieved through the employment of the precision time protocol (PTP) and/or a global positioning system time (GPST) receiver.

In Step 622, the L2 frame (i.e., the current L2 frame being processed of the L2 frame stream) is replicated. In one embodiment of the invention, replication of the L2 frame subsequently results in the obtaining of a L2 frame copy. Thereafter, in Step 624, the L2 frame stream chunk (initialized in Step 604 or re-initialized in Step 656 (described below)) is updated using the L2 frame copy (obtained in Step 622). In one embodiment of the invention, updating of the L2 frame stream chunk may entail concatenating the byte(s) representative of the L2 frame copy to the existing sequence of byte(s) (if any) stored in the L2 frame stream chunk.

For example, (a) for a first L2 frame (to be processed) within a given chunk time interval, the L2 frame stream chunk may be updated, through concatenation, to include the byte(s) representative of the first L2 frame—i.e., L2 frame stream chunk=bytes (first L2 frame); (b) for a second L2 frame (to be processed) within the given chunk time interval, the L2 frame stream chunk may be updated, through concatenation, to include the byte(s) representative of the first and second L2 frames—i.e., L2 frame stream chunk=bytes (first L2 frame)∥ bytes (second L2 frame); (c) for a third L2 frame (to be processed) within the given chunk time interval, the L2 frame stream chunk may be updated, through concatenation, to include the byte(s) representative of the first, second, and third L2 frames—i.e., L2 frame stream chunk=bytes (first L2 frame)∥bytes (second L2 frame)∥ bytes (third L2 frame); and so forth.

In Step 626, a determination is made as to whether the chunk interval timer (initiated in Step 610 or reset in Step 662 (described below)) has elapsed. In one embodiment of the invention, if it is determined that the chunk interval timer has elapsed, then the process may proceed to Step 628. On the other hand, in another embodiment of the invention, if it is alternatively determined that the chunk interval timer has not yet elapsed, then the process may alternatively proceed to Step 632.

In Step 628, after determining (in Step 626) that the chunk interval timer (described above) has elapsed, a chunk end timestamp is generated. In one embodiment of the invention, the chunk end timestamp may represent encoded information (e.g., a sequence of characters—e.g., letters, numbers, symbols, etc.) identifying a precise date and/or time reflective of an ending time boundary defining the L2 frame stream chunk (initialized in Step 604 or re-initialized in Step 656 (described below)). Further, the aforementioned precise data and/or time may be accurate up to the nanosecond (or picosecond) resolution, which may be achieved through the employment of the precision time protocol (PTP) and/or a global positioning system time (GPST) receiver.

In Step 630, following the generation of the chunk end timestamp (in Step 628), a time message is generated. In one embodiment of the invention, the time message may represent plain-text data pending cryptographic processing. Specifically, the time message may encompass a concatenation of bytes representative of the chunk start timestamp (generated in Step 608 or set in Step 658 (described below)), the chunk end timestamp (generated in Step 628), and the asymmetric key pair certificate (identified in Step 602). Hereinafter, the process may proceed to Step 640 (see e.g., FIG. 6C).

In Step 632, after alternatively determining (in Step 626) that the chunk interval timer (described above) has not yet elapsed, a determination is made as to whether the L2 frame (i.e., the current L2 frame being processed of the L2 frame stream) is the last L2 frame of the L2 frame stream. The determination may entail examining a flags field specified within the L2 frame. The flags field may encompass a collection of bits (i.e., binary digits), where each subset of one or more bits may reflect a state descriptive of the session or connection associated with the transmission of the L2 frame stream. By way of an example, one bit of the flags field, positioned at a predetermined bit location, may be used to indicate whether the L2 frame encloses the last of the transmitted data, thus reflecting that the L2 frame is indeed the last L2 frame of the L2 frame stream. The aforementioned bit of the flags field may substantially resemble the FIN flag used in the transmission control protocol (TCP), where a binary digit of '1' may indicate that a sender has finished sending data, whereas a binary digit of '0' may alternatively indicate that the sender has not finished sending data. Accordingly, in one embodiment of the invention, if it is determined, through examination of the flags field, that the L2 frame is the last L2 frame of the L2 frame stream, then the process may proceed to Step 628 (described above). On the other hand, in another embodiment of the invention, if it is alternatively determined, through examination of the flags field, that the L2 frame is not the last L2 frame of the L2 frame stream, then the process may alternatively proceed to Step 634.

In Step 634, after determining (in Step 632) that the L2 frame (i.e., the current L2 frame being processed of the L2 frame stream) is not the last L2 frame of the L2 frame stream, a timestamp trailer is appended to the L2 frame, to obtain an augmented L2 frame (see e.g., FIG. 2B). In one embodiment of the invention, the timestamp trailer may collectively represent various information detailing the verifiable network traffic generation process—e.g., the method disclosed in FIGS. 6A-6C. Specifically, the timestamp trailer may encompass zero or more trailer extensions, time information (e.g., the L2 frame timestamp (generated in Step 620)), one or more trailer flags, port identification information, device identification information, and frame sequence number information (all described above with respect to FIG. 2B).

In Step 636, the augmented L2 frame (obtained in Step 634) is transmitted. In one embodiment of the invention, the augmented L2 frame may be transmitted, across a network, to the frame auditor (see e.g., FIG. 1). Thereafter, the process ends (at least for the current L2 frame being processed of the L2 frame stream).

Turning to FIG. 6C, in Step 640, following the generation of the time message (in Step 630), a determination is made as to whether a previous signed L2 frame stream chunk hash is stored. A previous signed L2 frame stream chunk hash may represent a digital signature used in the verification of the data integrity, and the authentication, of a previous chunk message (described below), which may have been generated during the processing of a previous L2 frame stream chunk.

Accordingly, in one embodiment of the invention, if the current L2 frame stream chunk being processed is a first L2 frame stream chunk (to be processed) of the L2 frame stream (received in Step 606), then it may be determined that a previous signed L2 frame stream chunk hash has not been stored and, subsequently, the process may proceed to Step 642. On the other hand, in another embodiment of the invention, if the current L2 frame stream chunk being processed is not the first L2 frame stream chunk (to be processed) of the L2 frame stream, then it may be alternatively determined that a previous signed L2 frame stream chunk hash has been stored and, subsequently, the process may alternatively proceed to Step 644.

In Step 642, after determining (in Step 640) that a previous signed L2 frame stream chunk hash has not been stored, a chunk message is generated. In one embodiment of the invention, the chunk message may represent plain-text data pending cryptographic processing. Specifically, the chunk message may encompass a concatenation of the bytes representative of the L2 frame stream chunk (updated in Step 624) and the time message (generated in Step 630). Hereafter, the process may proceed to Step 646.

In Step 644, after alternatively determining (in Step 640) that a previous signed L2 frame stream chunk hash (associated with a previously defined L2 frame stream chunk) has been stored, a chunk message is generated. In one embodiment of the invention, the chunk message may represent plain-text data pending cryptographic processing. Specifically, the chunk message may encompass a concatenation of bytes representative of the previous signed L2 frame stream chunk hash (determined to have to been stored in Step 640), the L2 frame stream chunk (updated in Step 624), and the time message (generated in Step 630).

In Step 646, a L2 frame stream chunk hash is generated. In one embodiment of the invention, the L2 frame stream chunk hash may represent a hash value or digest used in the verification of the data integrity, and the authentication, of the chunk message. Accordingly, generation of the L2 frame stream chunk hash may entail using a non-cryptographic hashing function and the chunk message (generated either in Step 642 or Step 644). Further, the aforementioned non-cryptographic hashing function may refer to any existing or future developed non-cryptographic hashing function (e.g., the Pearson hashing function, the Fowler-Noll-Vo (FNV) hashing function, the Jenkins hashing function, etc.).

In Step 648, the L2 frame stream chunk hash (generated in Step 646) is digitally signed. Specifically, in one embodiment of the invention, the L2 frame stream chunk hash may be digitally signed to obtain a signed L2 frame stream chunk hash. The digital signing process may entail using a digital signature algorithm along with the asymmetric private key (identified in Step 600). The aforementioned digital signature algorithm may refer to any existing or future developed digital signature algorithm (e.g., any Rivest-Shamir-Adleman (RSA) based signature scheme, the Digital Signature Algorithm (DSA), etc.).

In Step 650, a signature message is generated. In one embodiment of the invention, the signature message may encompass a concatenation of bytes representative of the chunk message (generated in Step 642 or Step 644) and the signed L2 frame stream chunk hash (obtained in Step 648). In Step 652, thereafter, a timestamp trailer is appended to the L2 frame (i.e., the current L2 frame being processed of the L2 frame stream) to obtain an augmented L2 frame (see e.g., FIG. 2B). In one embodiment of the invention, the timestamp trailer may collectively represent various information detailing the verifiable network traffic generation process— e.g., the method disclosed in FIGS. 6A-6C. Specifically, the timestamp trailer may encompass one or more trailer extensions, time information, one or more trailer flags, port identification information, device identification information, and frame sequence number information (all described above with respect to FIG. 2B). Further, in one embodiment of the invention, the trailer extension(s) may collectively enclose the signature message (generated in Step 650).

In Step 654, the augmented L2 frame (obtained in Step 652) is transmitted. In one embodiment of the invention, the augmented L2 frame may be transmitted, across a network, to the frame auditor (see e.g., FIG. 1). Next, in Step 656, the L2 frame stream chunk is re-initialized. That is, in one embodiment of the invention, re-initialization of the L2 frame stream chunk may entail the deallocation of an existing non-empty, arbitrary length bit string (i.e., representative the existing, current L2 frame stream chunk) from memory and the allocation of a new empty, arbitrary length bit string (i.e., representative of the re-initialized L2 frame stream chunk) in memory.

In Step 658, the chunk start timestamp is updated. Specifically, in one embodiment of the invention, the chunk start timestamp may be updated to reflect the processing of a next L2 frame stream chunk of the L2 frame stream (received in Step 606). Accordingly, the next chunk start timestamp (for the next L2 frame stream chunk to be processed) may be configured as the current chunk end timestamp (for the current L2 frame stream chunk being processed).

In Step 660, the signed L2 frame stream chunk hash (generated in Step 648) is stored as the previous signed L2 frame stream chunk hash. In one embodiment of the invention, the stored signed L2 frame stream chunk hash may be employed during the processing of a next L2 frame stream chunk (if any) of the L2 frame stream (received in Step 606). Furthermore, in Step 662, the chunk interval timer is reset, thus, measuring the time spanning another chunk time interval, which may define the next L2 frame stream chunk (if any). Hereinafter, the process ends (at least for the current L2 frame being processed of the L2 frame stream).

Figure 7A:
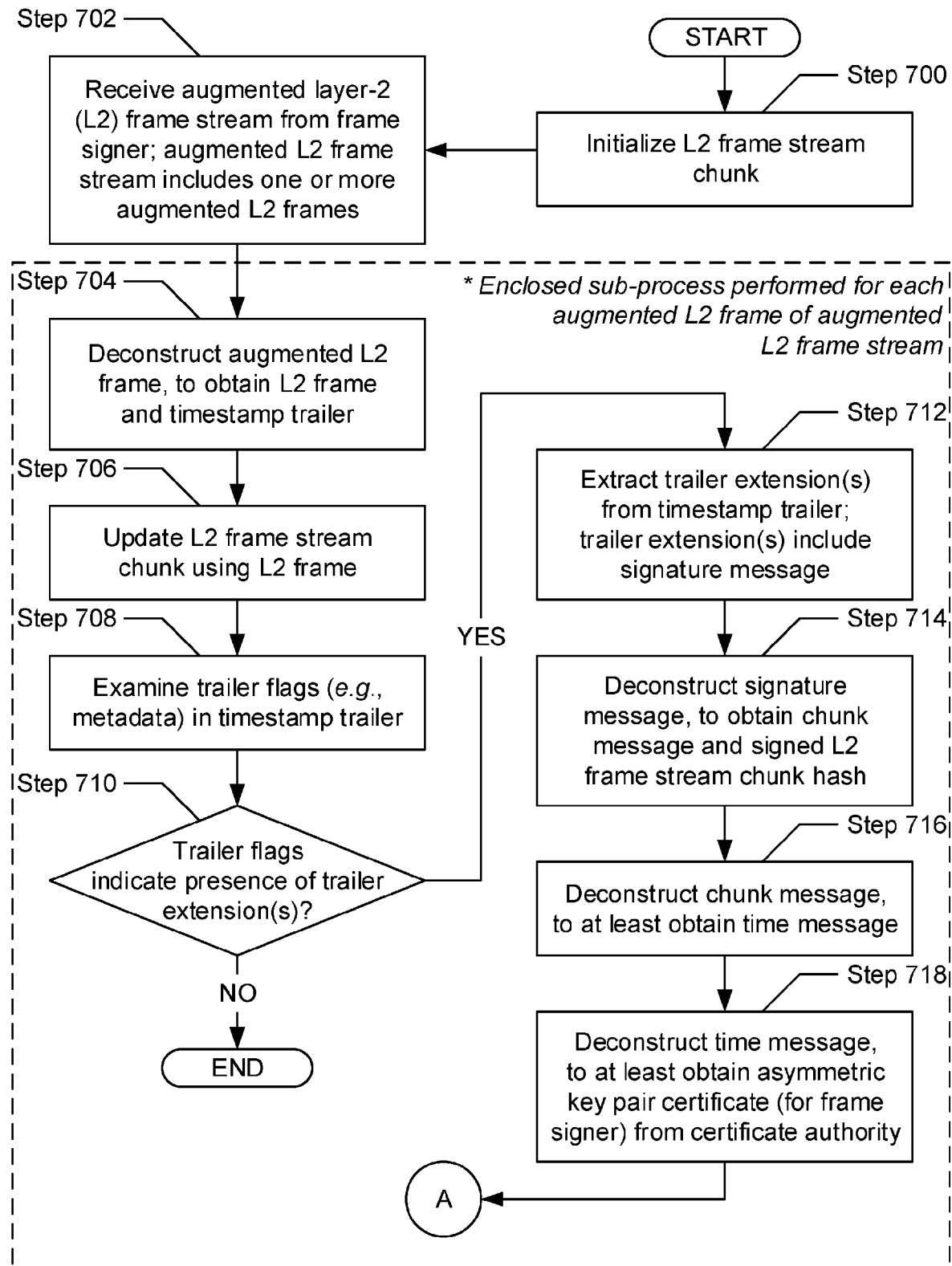
FIGS. 7A and 7B show flowcharts describing a method for authenticating verifiable network traffic in accordance with one or more embodiments of the invention.
Figure 7B:
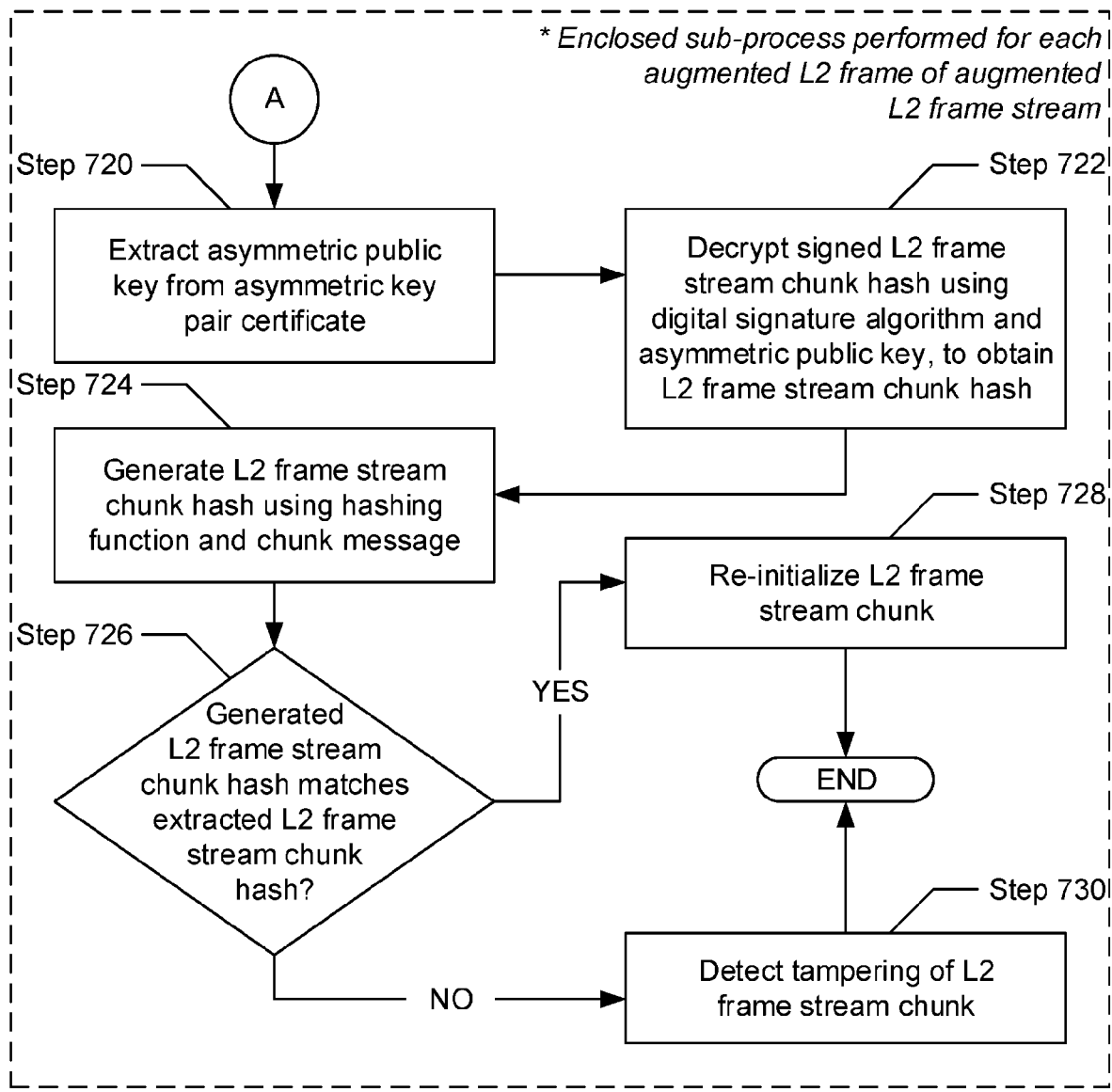

FIGS. 7A and 7B show flowcharts describing a method for authenticating verifiable network traffic in accordance with one or more embodiments of the invention. The various steps outlined below may be performed by the frame auditor (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7A, in Step 700, a layer-2 (L2) frame stream chunk is initialized. In one embodiment of the invention, the L2 frame stream chunk may represent a data object (e.g., a bit string variable) used for storing the byte(s) of information representative of an arbitrary portion of a L2 frame stream. A L2 frame stream may represent any single transmission of data from one entity to another (e.g., from the frame signer to the frame destination), which may encompass one or more L2 frames (see e.g., FIG. 2A). Accordingly, the L2 frame stream chunk may be used throughout the various steps outlined below to store one or more segments of a L2 frame stream, where each defined segment (or chunk) may include one or more L2 frames (e.g., an arbitrary subset of the total L2 frame count) of the L2 frame stream being processed. Further, initialization of the L2 frame stream chunk may entail allocation of an empty, arbitrary length bit string in memory.

In one embodiment of the invention, each L2 frame stream chunk may encompass one or more L2 frames of a L2 frame stream, which may have been received within a specified time interval—e.g., a specified chunk time interval. Subsequently, each L2 frame stream chunk may be further defined or associated with a chunk start timestamp and a chunk end timestamp, which reflect the time boundaries between which the L2 frame(s) of a given L2 frame stream chunk had been received. Therefore, a receipt-based timestamp for each L2 frame of a given L2 frame stream chunk may lie within or between the determined chunk start and end timestamps for the given L2 frame stream chunk. Furthermore, should a L2 frame stream span multiple L2 frame stream chunks, the chunk start timestamp of each successive L2 frame stream chunk may equal the chunk end timestamp of the previous L2 frame stream chunk.

In Step 702, an augmented L2 frame stream is received. In one embodiment of the invention, the received augmented L2 frame stream may have arrived, through a network, from the frame signer (see e.g., FIG. 1). Further, the received augmented L2 frame stream may represent a sequence of one or more augmented L2 frames (see e.g., FIG. 2B).

Hereinafter, the various remaining steps outlined below may be performed for each augmented L2 frame of the augmented L2 frame stream (received in Step 702). That is, the performance of the various remaining steps outlined below may be triggered upon the receipt or arrival of each individual augmented L2 frame of the augmented L2 frame stream.

In Step 704, the augmented L2 frame (i.e., the current augmented L2 frame being processed of the augmented L2 frame stream) is deconstructed. Specifically, in one embodiment of the invention, the augmented L2 frame may be deconstructed into a L2 frame (see e.g., FIG. 2A) and a timestamp trailer. The timestamp trailer may collectively represent various information detailing the verifiable network traffic generation process—e.g., the method disclosed in FIGS. 6A-6C. Specifically, the timestamp trailer may encompass zero or more trailer extensions, time information, one or more trailer flags, port identification information, device identification information, and frame sequence number information (all described above with respect to FIG. 2B). Further, deconstruction of the augmented L2 frame may employ any existing or future developed data parsing algorithm.

In Step 706, the L2 frame stream chunk (initialized in Step 700 or re-initialized in Step 728 (described below)) is updated using the L2 frame (obtained in Step 704). In one embodiment of the invention, updating of the L2 frame stream chunk may entail concatenating the byte(s) representative of the L2 frame to the existing sequence of byte(s) (if any) stored in the L2 frame stream chunk.

For example, (a) for a first L2 frame (obtained through deconstruction of a first augmented L2 frame) within a given chunk time interval, the L2 frame stream chunk may be updated, through concatenation, to include the byte(s) representative of the first L2 frame—i.e., L2 frame stream chunk=bytes (first L2 frame); (b) for a second L2 frame (obtained through deconstruction of a second augmented L2 frame) within the given chunk time interval, the L2 frame stream chunk may be updated, through concatenation, to include the byte(s) representative of the first and second L2 frames—i.e., L2 frame stream chunk=bytes (first L2 frame)|| bytes (second L2 frame); (c) for a third L2 frame (obtained through deconstruction of a third augmented L2 frame) within the given chunk time interval, the L2 frame stream chunk may be updated, through concatenation, to include the byte(s) representative of the first, second, and third L2 frames—i.e., L2 frame stream chunk=bytes (first L2 frame) ||bytes (second L2 frame)|| bytes (third L2 frame); and so forth.

In Step 708, the trailer flags field of the timestamp trailer (obtained in Step 704) is examined. In one embodiment of the invention, the trailer flags field may encompass a collection of bits (i.e., binary digits), where each subset of one or more bits may reflect a state descriptive of another field in the L2 frame (also obtained in Step 704) and/or the timestamp trailer. By way of an example, one bit of the trailer flags field, positioned at a predetermined bit location, may be used to indicate whether the timestamp trailer includes at least one trailer extension (described above)—e.g., a binary digit of '1' may indicate that the timestamp trailer does include at least one trailer extension, whereas a binary digit of '0' may alternatively indicate that the timestamp trailer does not include any trailer extensions.

In Step 710, a determination is made as to whether the trailer flag field (examined in Step 708) reflects a presence of at least one trailer extension enclosed in the timestamp trailer (obtained in Step 704). In one embodiment of the invention, if it is determined that the above-mentioned examination indicates that the timestamp trailer does include at least one trailer extension, then the process may proceed to Step 712. On the other hand, in another embodiment of the invention, if it is alternatively determined that the above-mentioned examination indicates that the timestamp trailer does not include any trailer extensions, then the process ends (at least for the current augmented L2 frame being processed of the augmented L2 frame stream).

In Step 712, after determining (in Step 710) that the timestamp trailer (obtained in Step 704) includes at least one trailer extension (see e.g., FIG. 2B), the trailer extension(s) is/are extracted from the timestamp trailer. In one embodiment of the invention, the timestamp trailer may subsequently be deconstructed (or parsed) to obtain a signature message (described above).

In Step 714, the signature message (obtained in Step 712) is deconstructed. Specifically, in one embodiment of the invention, the signature message may be deconstructed into a chunk message and a signed L2 frame stream chunk hash. The chunk message may represent plain-text data pending cryptographic processing. Specifically, the chunk message may encompass a concatenation of the bytes representative of a L2 frame stream chunk and a time message. Meanwhile, the signed L2 frame stream chunk hash may represent a digital signature used in the verification of the data integrity, and the authentication, of the aforementioned chunk message. Further, deconstruction of the signature message may employ any existing or future developed data parsing algorithm.

In Step 716, the chunk message (obtained in Step 714) is deconstructed. Specifically, in one embodiment of the invention, the chunk message may be deconstructed to at least obtain the time message (mentioned above). The time message may encompass a concatenation of bytes representative of a chunk start timestamp, a chunk end timestamp, and an asymmetric key pair certificate. The chunk start timestamp may represent encoded information (e.g., a sequence of characters—e.g., letters, numbers, symbols, etc.) identifying a precise date and/or time reflective of a starting time boundary defining the L2 frame stream chunk (initialized in Step 700 or re-initialized in Step 728 (described below)). The chunk end timestamp may represent encoded information (e.g., a sequence of characters—e.g., letters, numbers, symbols, etc.) identifying a precise date and/or time reflective of an ending time boundary defining the L2 frame stream chunk. Furthermore, the asymmetric key pair certificate may represent a digital document that presents credentials for verifying the identity of the certificate owner—e.g., the frame signer. Moreover, deconstruction of the chunk message may employ any existing or future developed data parsing algorithm.

In Step 718, the time message (obtained in Step 716) is deconstructed. Specifically, in one embodiment of the invention, the time message may be deconstructed to at least obtain the asymmetric key pair certificate (mentioned above). The asymmetric key pair certificate may represent a digital document that proves ownership of an asymmetric public key, which may be enclosed in the asymmetric key pair certificate. Generally, the asymmetric key pair certificate may also include various information describing the enclosed asymmetric public key and the certificate owner; and a digital signature associated with the certificate issuer—e.g., the certificate authority (see e.g., FIG. 1)—whom had verified the contents of the asymmetric key pair certificate.

Turning to FIG. 7B, in Step 720, an asymmetric public key is extracted from the asymmetric key pair certificate (obtained in Step 718). In one embodiment of the invention, the asymmetric public key may represent one of a pair of encryption keys employed in a digital signature algorithm. With respect to digital signing, the asymmetric public key may be used to decrypt a digital signature (i.e., encrypted data) to obtain plain-text data (i.e., unencrypted data).

In Step 722, the signed L2 frame stream chunk hash (obtained in Step 714) is decrypted. Specifically, in one embodiment of the invention, the signed L2 frame stream chunk hash may be decrypted to obtain a L2 frame stream chunk hash. The decryption may entail using a digital signature algorithm along with the asymmetric public key (extracted in Step 720). The aforementioned digital signature algorithm may refer to any existing or future developed digital signature algorithm (e.g., any Rivest-Shamir-Adleman (RSA) based signature scheme, the Digital Signature Algorithm (DSA), etc.).

In Step 724, a L2 frame stream chunk hash is generated. In one embodiment of the invention, the L2 frame stream chunk hash may represent a hash value or digest used in the verification of the data integrity, and the authentication, of a chunk message. Accordingly, generation of the L2 frame stream chunk hash may entail using a non-cryptographic hashing function and the chunk message (obtained in Step 714). Further, the aforementioned non-cryptographic hashing function may refer to any existing or future developed non-cryptographic hashing function (e.g., the Pearson hashing function, the Fowler-Noll-Vo (FNV) hashing function, the Jenkins hashing function, etc.).

In Step 726, a determination is made as to whether the L2 frame stream chunk hash (generated in Step 724) matches the L2 frame stream chunk hash (obtained through decryption in Step 722). In one embodiment of the invention, if it is determined that both L2 frame stream chunk hashes match, then a data integrity and authenticity of the chunk message is verified and, subsequently, the process may proceed to Step 728. On the other hand, if it is alternatively determined that both L2 frame stream chunk hashes mismatch, then the data integrity and/or authenticity of the chunk message reflects a breach and, subsequently, the process may alternatively proceed to Step 730.

In Step 728, after determining (in Step 726) that the L2 frame stream chunk hash (generated in Step 724) matches the L2 frame stream chunk hash (obtained through decryption in Step 722), the L2 frame stream chunk is re-initialized.

That is, in one embodiment of the invention, re-initialization of the L2 frame stream chunk may entail the deallocation of an existing non-empty, arbitrary length bit string (i.e., representative the existing, current L2 frame stream chunk) from memory and the allocation of a new empty, arbitrary length bit string (i.e., representative of the re-initialized L2 frame stream chunk) in memory. Hereinafter, the process ends (at least for the current augmented L2 frame being processed of the augmented L2 frame stream).

In Step 730, after alternatively determining (in Step 726) that the L2 frame stream chunk hash (generated in Step 724) mismatches the L2 frame stream chunk hash (obtained through decryption in Step 722), evidence of network traffic tampering is detected. Based on the detection, in one embodiment of the invention, an alert may be issued and presented to operators and/or administrators of the frame auditor, whom may disclose the tampering and/or impose punitive action(s) on the operators and/or administrators of the frame signer. Further, based on the aforementioned detection, the overall processing of the augmented L2 frame stream may be aborted.

Figure 8:
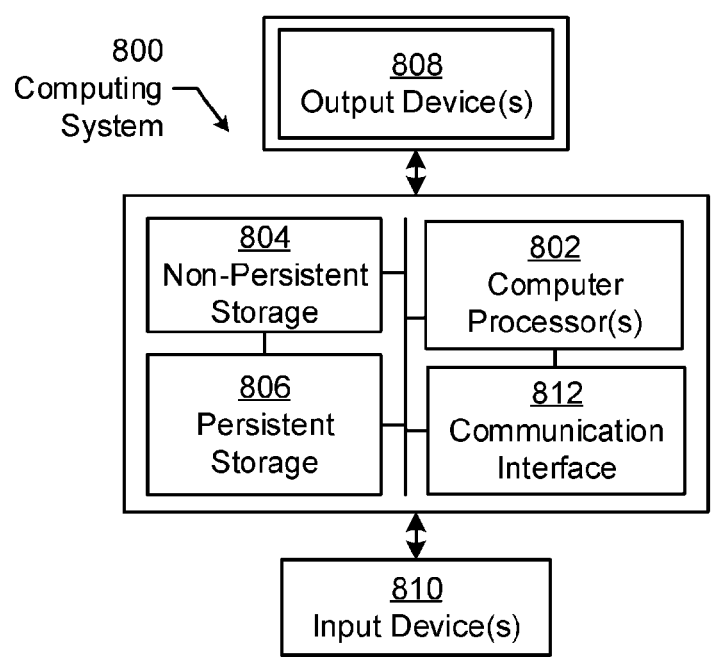
FIG. 8 shows a computing system in accordance with one or more embodiments of the invention.

FIG. 8 shows a computing system in accordance with one or more embodiments of the invention. The computing system (800) may include one or more computer processors (1302), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating verifiable network traffic, comprising:
   receiving a first layer-2 (L2) frame of a L2 frame stream;
   generating a first L2 frame timestamp for the first L2 frame;
   generating a first frame message using the first L2 frame and the first L2 frame timestamp;
   generating a first frame hash-based message authentication code (HMAC) using a hashing function, the first frame message, and a symmetric private key;
   appending a first timestamp trailer to the first L2 frame, to obtain a first augmented L2 frame; and
   transmitting the first augmented L2 frame to a frame auditor,
   wherein the first timestamp trailer comprises the first frame HMAC, the first L2 frame, and the first L2 frame timestamp.

2. The method of claim 1, wherein the first L2 frame is an Ethernet frame or a media access control (MAC) frame.

3. The method of claim 1, wherein the first L2 frame timestamp encodes a receipt time in nanosecond resolution associated with receiving the first L2 frame.

4. The method of claim 1, further comprising:
   receiving a second L2 frame of the L2 frame stream;
   generating a second L2 frame timestamp for the second L2 frame;
   generating a second L2 frame message using the second L2 frame, the second L2 frame timestamp, and the first frame HMAC;
   generating a second frame HMAC using the hashing function, the second frame message, and the symmetric private key;
   appending a second timestamp trailer to the second L2 frame, to obtain a second augmented L2 frame; and
   transmitting the second augmented L2 frame to the frame auditor,
   wherein the second timestamp trailer comprises the second frame HMAC, the second L2 frame, and the second L2 frame timestamp.

5. The method of claim 4, further comprising:
   receiving a third L2 frame of the L2 frame stream;
   generating a third L2 frame timestamp for the third L2 frame;
   generating a third L2 frame message using the third L2 frame, the third L2 frame timestamp, and the second frame HMAC;
   generating a third frame HMAC using the hashing function, the third frame message, and the symmetric private key;
   appending a third timestamp trailer to the third L2 frame, to obtain a third augmented L2 frame; and
   transmitting the third augmented L2 frame to the frame auditor,
   wherein the third timestamp trailer comprises the third frame HMAC, the third L2 frame, and the third L2 frame timestamp.

6. The method of claim 1, further comprising:
prior to generating the first frame HMAC:
- making a determination that a key generation interval timer has elapsed; and
- generating, based on the determination, the symmetric private key.

7. The method of claim 6, further comprising:
based on the determination:
- generating a symmetric private key timestamp for the symmetric private key;
- identifying an asymmetric key pair certificate;
- extracting an asymmetric public key from the asymmetric key pair certificate;
- encrypting the symmetric private key using a cryptographic algorithm and the asymmetric public key, to obtain an encrypted symmetric private key;
- generating a new key message using the asymmetric key pair certificate, the encrypted symmetric private key, and the symmetric private key timestamp; and
- generating a new key HMAC using the hashing function, the new key message, and the symmetric private key.

8. The method of claim 7, wherein the symmetric private key timestamp encodes a generation time in nanosecond resolution associated with generating the symmetric private key.

9. The method of claim 7, wherein the asymmetric key pair certificate is associated with the frame auditor.

10. The method of claim 7, wherein the first timestamp trailer further comprises the new key message and the new key HMAC.

11. A method for authenticating verifiable network traffic, comprising:
- receiving a first augmented layer-2 (L2) frame of an augmented L2 frame stream;
- deconstructing the first augmented L2 frame, to obtain a first L2 frame and a first timestamp trailer;
- extracting a first frame hash-based message authentication code (HMAC) and a first L2 frame timestamp from the first timestamp trailer;
- generating a first frame message using the first L2 frame and the first L2 frame timestamp;
- generating a second frame HMAC using a hashing function, the first frame message, and a symmetric private key; and
- authenticating the first L2 frame through comparison of the first frame HMAC and the second frame HMAC.

12. The method of claim 11, wherein authenticating the first L2 frame comprises:
- making a determination that the first frame HMAC matches the second frame HMAC; and
- detecting, based on the determination, that the first L2 frame is authentic.

13. The method of claim 11, wherein authenticating the first L2 frame comprises:
- making a determination that the first frame HMAC mismatches the second frame HMAC; and
- detecting, based on the determination, that the first L2 frame is not authentic.

14. The method of claim 11, further comprising:
- receiving a second augmented L2 frame of the augmented L2 frame stream;
- deconstructing the second augmented L2 frame, to obtain a second L2 frame and a second timestamp trailer;
- extracting a third frame HMAC and a second L2 frame timestamp from the second timestamp trailer;
- generating a second frame message using the second L2 frame, the second L2 frame timestamp, and the first frame HMAC;
- generating a fourth frame HMAC using the hashing function, the second frame message, and the symmetric private key; and
- authenticating the second L2 frame through comparison of the third frame HMAC and the fourth frame HMAC.

15. The method of claim 14, further comprising:
- receiving a third augmented L2 frame of the augmented L2 frame stream;
- deconstructing the third augmented L2 frame, to obtain a third L2 frame and a third timestamp trailer;
- extracting a fifth frame HMAC and a third L2 frame timestamp from the third timestamp trailer;
- generating a third frame message using the third L2 frame, the third L2 frame timestamp, and the third frame HMAC;
- generating a sixth frame HMAC using the hashing function, the third frame message, and the symmetric private key; and
- authenticating the third L2 frame through comparison of the fifth frame HMAC and the sixth frame HMAC.

16. The method of claim 11, further comprising:
prior to extracting the first frame HMAC and the first L2 frame timestamp from the first timestamp trailer:
- examining a trailer flag of a set of trailer flags specified in the first timestamp trailer;
- making a determination, based on the examining, that the first timestamp trailer comprises a set of trailer extensions; and
- extracting, based on the determination, the set of trailer extensions from the first timestamp trailer,
wherein the set of trailer extensions comprises the first frame HMAC and the first L2 frame timestamp.

17. The method of claim 11, further comprising:
prior to generating the first frame message:
- extracting a new key message and a first new key HMAC from the first timestamp trailer;
- generating a second new key HMAC using the hashing function, the new key message, and the symmetric private key; and
- making a determination, through comparison, that the first new key HMAC matches the second new key HMAC.

18. The method of claim 17, further comprising:
prior to generating the second new key HMAC:
- extracting an encrypted symmetric private key from the new key message; and
- decrypting the encrypted symmetric private key using a cryptographic algorithm and an asymmetric private key, to obtain the symmetric private key.

19. A system, comprising:
a frame signer comprising a first computer processor configured to:
- receive a layer-2 (L2) frame of a L2 frame stream;
- generate a L2 frame timestamp for the L2 frame;
- generate a frame message using the L2 frame and the L2 frame timestamp;
- generate a frame hash-based message authentication code (HMAC) using a hashing function, the frame message, and a symmetric private key;
- append a timestamp trailer to the L2 frame, to obtain an augmented L2 frame; and
- transmit the augmented L2 frame,
wherein the timestamp trailer comprises the frame HMAC, the L2 frame, and the L2 frame timestamp.

20. The system of claim 19, further comprising:
a frame auditor operatively connected to the frame signer and comprising a second computer processor configured to:
receive the augmented L2 frame;
deconstruct the augmented L2 frame, to obtain the L2 frame and the timestamp trailer;
extract the HMAC and the L2 frame timestamp from the timestamp trailer;
generate a second frame message using the L2 frame and the L2 frame timestamp;
generate a second frame HMAC using the hashing function, the frame message, and the symmetric private key; and
authenticate the L2 frame through comparison of the frame HMAC and the second frame HMAC.

* * * * *